US008538038B1

(12) United States Patent
Lester

(10) Patent No.: US 8,538,038 B1
(45) Date of Patent: Sep. 17, 2013

(54) AUDIO MUTE CONCEALMENT

(75) Inventor: Michael Ryan Lester, Colorado Springs, CO (US)

(73) Assignee: Shure Acquisition Holdings, Inc., Niles, IL (US)

( * ) Notice: Subject to any disclaimer, the term of this patent is extended or adjusted under 35 U.S.C. 154(b) by 749 days.

(21) Appl. No.: 12/705,034

(22) Filed: Feb. 12, 2010

(51) Int. Cl.
*H04B 15/00* (2006.01)
*H04M 3/00* (2006.01)

(52) U.S. Cl.
USPC .......... 381/94.5; 375/259

(58) Field of Classification Search
USPC ........... 381/73.1, 77, 182; 455/436; 375/259
See application file for complete search history.

(56) References Cited

U.S. PATENT DOCUMENTS 5,016,269 A * 5/1991 Rogers .................. 455/404.1
6,671,325 B2 * 12/2003 Lee et al. .................. 375/259
2002/0142772 A1 * 10/2002 Hunzinger .................. 455/436
2003/0053548 A1 * 3/2003 Lee et al. .................. 375/259

* cited by examiner

*Primary Examiner* — Fan Tsang
*Assistant Examiner* — Eugene Zhao
(74) *Attorney, Agent, or Firm* — Banner & Witcoff, Ltd.

(57) ABSTRACT

Mute intervals of an audio signal are concealed by decreasing a user's perception of missing audio information. During the mute interval, different concealment techniques are activated at different times to form a concealment signal. The concealment signal is applied to the processed audio signal during the mute interval. A concealment technique may process buffered audio samples before the mute interval in order to obtain the concealment signal. Also, a previously activated concealment generator may be phased out while the currently activated concealment generator may be phased in during a transition period of a mute interval. Different concealment techniques may be used to generate a concealment signal, including a periodic extension concealment technique, a reverberation concealment technique, and a spectral replication technique. Further, the power levels may be matched between different periods of a mute interval.

36 Claims, 19 Drawing Sheets

1100

AUDIO MUTE CONCEALMENT

TECHNICAL FIELD

Aspects of the disclosure process an audio signal so that a concealment signal is applied to the audio signal when muting of the audio signal would occur if the audio signal were not processed.

BACKGROUND

Gaps in audio may occur when the transmission of audio information is incomplete, gets corrupted, or is interrupted. When the transmission fails temporarily and then resumes, a mute in the audio may occur. The incomplete transmission can occur due to many transmission faults. One such example is incompletely received radio frequency (RF) transmission from a wireless microphone.

Multi-path fading is often inevitable in wireless transmission. When the transmitted RF signal is reflected off of a surface, the direct and reflected signals arrive at the receiver at different times and may be destructively cancelled. The cancellation of signals often causes the RF power at the receiver antenna to fade, resulting in degraded communications. The position of the transmitter in an environment that causes fading is called a null. When the wireless microphone user moves the transmitter through the null, the audio signal may degrade in quality and in most cases may ultimately squelch, causing a mute in the audio stream. As soon as the transmitter is moved out of the null, the audio may return. If the transmitter is moved through the null in a finite amount of time, a mute interval occurs. Of course, if the transmitter stays in a null, the audio is muted forever. When the transmitter moves through a null at approximately a human walking pace, the mute is relatively short.

SUMMARY

This summary is provided to introduce a selection of concepts in a simplified form that are further described below in the Detailed Description. This Summary is not intended to identify key features or essential features of the disclosure.

Mute intervals of an audio signal are concealed by decreasing a listener's perception of missing audio information. During the mute interval, different concealment techniques are activated at different times to form a concealment signal. The concealment signal is applied to the processed audio signal during the mute interval. A concealment technique may process buffered audio samples before the mute interval in order to obtain the concealment signal. The concealment techniques as well as the selection and execution of the techniques do not benefit from access to the audio content after the mute interval.

With another aspect of the disclosure, when a mute interval of an audio signal is detected, one of a plurality of concealment generators and a timer are activated, where each concealment generator utilizing a different concealment technique. While the mute interval continues and when the timer equals a predetermined activation time, a different concealment generator is activated and a previously activated concealment generator is deactivated to extend the concealment signal. The concealment signal is added during the mute interval, and the currently activated concealment generator is deactivated when the mute interval ends.

With another aspect of the disclosure, a previously activated concealment generator is phased out while the currently activated concealment generator is phased in during a transition period of a mute interval. A linearly increasing function and a linearly decreasing function may be applied to outputs of the currently activated concealment generator and the previously activated concealment generator, respectively. Alternately, a logarithmically increasing and decreasing function may be used.

With another aspect of the disclosure, different concealment techniques are used to generate a concealment signal, including a periodic extension concealment technique, a reverberation concealment technique, and a spectral replication technique. Each concealment technique may be utilized during different periods of a mute interval.

With another aspect of the disclosure, the power level of the audio signal prior to the mute interval is continued when generating a concealment signal. Also, the power level of the currently activated concealment generator is matched with the power level of the previously activated concealment generator.

With another aspect of the disclosure, a periodic extension concealment technique detects a mute interval of an audio signal, detects a zero crossing of the audio signal after the mute interval is detected, and activates a concealment generator to form a concealment signal. The concealment generator processes buffered audio samples by reversing the buffered audio samples in the time domain after the zero crossing with a flip in waveform polarity to prevent a waveform discontinuity.

With another aspect of the disclosure, a spectral replication concealment technique detects a mute interval of an audio signal, obtains buffered samples of the audio signal before the mute interval occurs, performs a spectral analysis of the buffered samples to obtain spectral samples, determines a magnitude of each spectral sample, combines the magnitude and a random phase value for each spectral sample to obtain modified spectral samples, performs an inverse spectral analysis of the modified spectral samples to obtain time domain samples, and removes an imaginary component of each time domain sample to obtain a concealment signal.

With another aspect of the disclosure, the parameters of concealment techniques, status of concealment execution, and the phasing between the various concealment techniques may be controlled based on an audio feature analysis which will provide adaptive audio mute concealment based on characteristics of the audio prior to the concealment.

BRIEF DESCRIPTION OF THE DRAWINGS

A more complete understanding of the exemplary embodiments the present invention and the advantages thereof may be acquired by referring to the following description in consideration of the accompanying drawings, in which like reference numbers indicate like features and wherein.

DETAILED DESCRIPTION

In the following description of the various exemplary embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Gaps in audio may occur when the transmission of audio information is incomplete, gets corrupted, or is interrupted. When the transmission fails temporarily and then resumes, a mute in the audio will occur. If the mute interval is minimal in time, it is possible to conceal the mute by replacing the mute with audio information that is similar to the information that was missing. The incomplete transmission can occur due to many transmission faults. One such example is incompletely received radio frequency (RF) transmission from a wireless microphone.

Due to the probabilistic nature of RF fading, nulls can occur at any time and at many received power levels. If short mutes are occurring due to particular environmental and usage conditions, mutes may be able to be concealed and the useful operation of the system may be increased by reducing the chance that an audio mute will randomly occur at higher received power levels.

Figure 1:
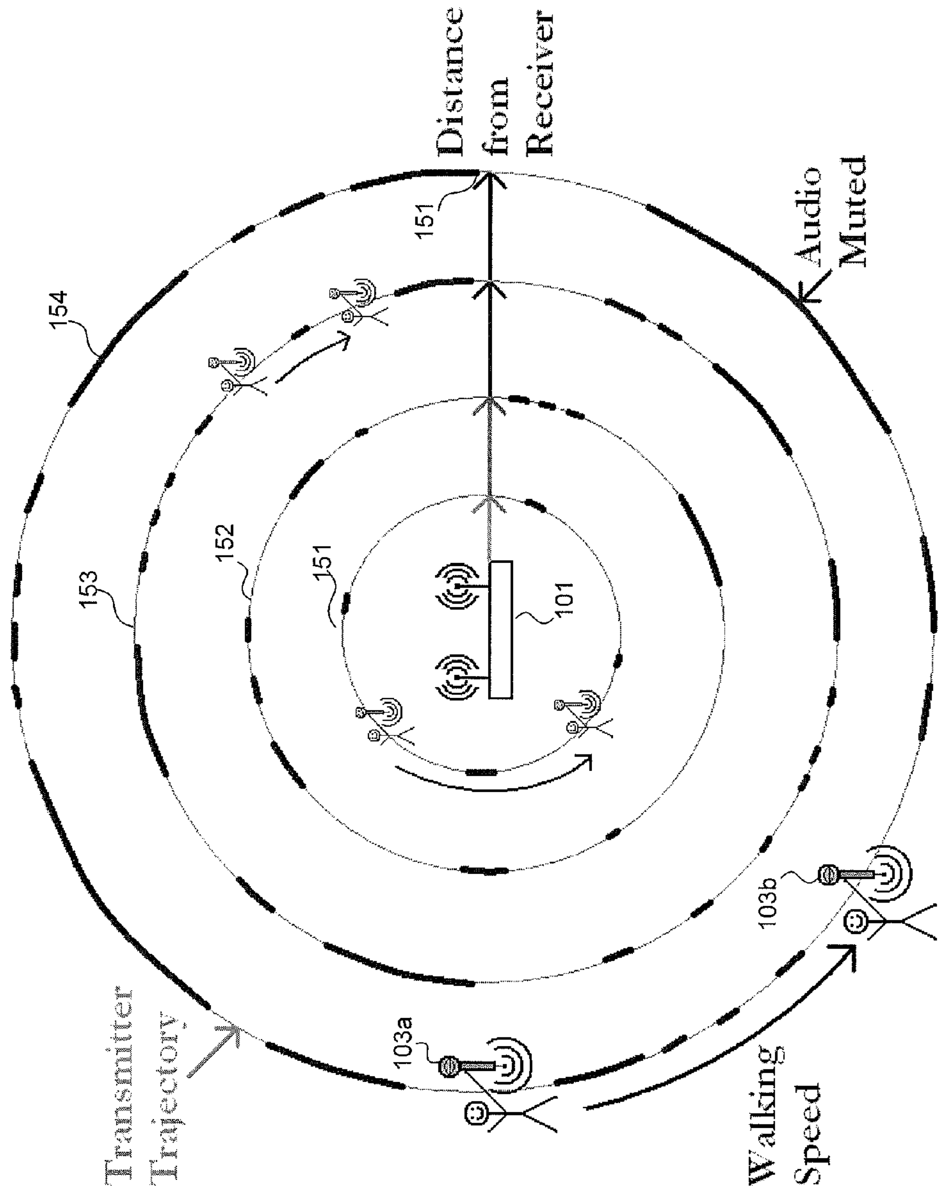
FIG. 1 shows an example of wireless range performance in accordance with aspects of the disclosure.

FIG. 1 shows an exemplary scenario of wireless range performance in accordance with aspects of the disclosure. When a wireless transmitter (e.g., located at position 103*a*) is located near the perceived maximum range of a wireless microphone system's operating range, the signal power received at receiver 101 typically varies over time with the fades in a real environment. When the received level falls below the squelch level, the output is muted. The audio may degrade before the squelch point, as may be the case with an FM modulated analog audio signal, or may be received as a non-degraded signal until the squelch point, as may be a digital audio source with a digitally modulated transmission technique. In either situation, the introduction of interfering RF energy further decreases the usable range and induces the perceived end of range at a decreased distance.

As will be further discussed, an audio mute concealment (AMC) algorithm may be used to conceal short mutes or errors in a real-time audio stream. With some embodiments, an effective time duration (near imperceptible concealment) of mute concealment varies from about 2 milliseconds to 100 milliseconds. After 100 milliseconds, the AMC algorithm may continue to conceal the mute interval; however the effectiveness is reduced (concealment may be more readily perceived). It may be more prudent to fade gracefully into silence or a low-level 'comfort noise' after the effective time duration.

An illustrative embodiment of the AMC algorithm may be applied to an audio signal that is intended to be processed in real-time in a sample-by-sample digital audio framework. In an embodiment, the AMC algorithm is applied based on audio content prior to the mute and does not use knowledge of the audio content after the mute interval in order to reduce, and in some cases, eliminate processing latency. Additionally, relying only on audio content prior to the mute allows for mute concealment of various mute intervals rather than needing to know the particular mute interval for each AMC instantiation.

The AMC algorithm may conceal mutes by decreasing the ear and brain's perception of missing audio information. A sufficiently short mute may naturally be perceived as being continuous. However for both longer and short mutes, inserting conditioned audio into the mute may increase perceptual continuity. The AMC algorithm may be able to perceptually conceal muting by exploiting the predictive nature of the user's hearing characteristics, where audio content is typically relatively stationary during short mute intervals. Due to these assumptions, the AMC algorithm may be sensitive to the audio program material and the length of a mute interval. For instance, these assumptions are more accurate for long, flowing singing passages with many vowels rather than for percussive instruments. As will be further discussed, an audio feature detector may be used to analyze the characteristics of the audio signal and adjust parameters to make the algorithm more effective with audio material that is difficult to mute concealment. During a long mute interval, the window size with which the assumptions hold true is exceeded and mute concealment may not be as effective. With some embodiments, the AMC algorithm is applied only in the range of mute lengths that can be effectively concealed. If the ear-brain system of a user expects a change in the audio content when in fact the concealed audio is stationary, the mute may not be effectively concealed.

There is a varying probability that the mute may occur during a favorable audio passage when concealing a mute. This probability ensures that the AMC algorithm may not have a so-called static percent effectiveness rating or any other objective measurement of effectiveness. Additionally, any concealment artifacts may be correlated to the audio content, making measurements of effectiveness difficult to quantify. Subjective quality can be tested, but may only be applicable to the audio content chosen for the test. Careful test design may produce subjective results that are general enough for a description of effectiveness.

The AMC algorithm may be configured to be a low latency, possibly even a zero latency, inline mute concealment algorithm. The latency that would be incurred by the algorithm is due only to digitization (if the audio is not already in a digital format) and possibly look-ahead to ensure a good switch between real audio and concealed audio (if the notification for the mute cannot be given in advance).

With some embodiments, the AMC algorithm may not detect mutes in the audio signal by itself. Rather, AMC apparatus executing the algorithm may be notified when a mute is occurring by a parent system. A built-in audio-level detector may not be included due to the additional latency and complexity that is necessary to reliably detect a mute in the audio stream. However, the AMC algorithm may be modified to account for a number of parameters in order to perform a muting decision.

In regards to the exemplary scenario of wireless range performance, the principle of perceptual wireless microphone operation range extension is rooted in exploiting the operating habits and opinions of the audio system designer. The goal is to increase the designer's confidence in the wireless system, not to increase the fringe end of range operation. In many cases, the designer may identify the nearest distance that will incite a mute and will label this as the useful end of range. While this does allow the designer to minimize audio muting during a performance, only a fraction of the wireless link allowance is used since the minimum of a probabilistic function was used as a determining factor.

With some embodiments, the true fringe end of range is not increased using the AMC algorithm. However, the point at which a user perceives that the system is beginning to fail may be moved further away from the receiver and closer to the true end of range. The minimum distance that creates perceived degradation in the audio signal affects the confidence in the wireless product performance.

Referring to FIG. 1, executing an AMC algorithm may increase the confidence in the wireless product. Each concentric circle 151, 153, 155, or 154 is a set distance away from receiver 101. If the user with a wireless microphone walks around a circle (e.g., from position 103*a* to 103*b*) at a constant speed, there may be an average muting rate (dropouts per minute) and a range of mute lengths, as well as a distribution for each parameter, due to fading. In general, as the user moves out to a more distant circle, the dropout rate increases as well as the duration of these dropouts.

The innermost transmitter trajectory (depicted as a circle in FIG. 1) that contains an egregious dropout typically determines the perceived effective range of the system. By executing the AMC algorithm, a mute interval may be effectively concealed up to a maximum mute length, thus extending the maximum range from receiver 101 at which egregiously perceived dropouts are perceived. In other words, the first circle that has a mute length that is longer than the effective concealing length of the AMC algorithm now defines the critical range of this system. This perceived range extension increases the critical usable wireless range, effectively utilizing more of the wireless link allowance. Additionally, the confidence in the product may be increased due to the perceived enhanced range without actually increasing the fringe end of range.

Although the AMC algorithm may not actually increase the fringe end of range of a wireless system, it may be able to decrease its subjective annoyance. The rate and duration of muting due to end of range may be too intense for the AMC algorithm to conceal. However, the AMC algorithm may continue to operate and attempt to conceal up to its effective mute length. This approach may reduce the mute length that is not concealed.

The presence of interfering RF energy on the RF signal containing the audio information usually has a similar effect to reducing the distance from the receiver to fringe end of range for a wireless microphone. Interfering energy increases the noise floor of the demodulation of the RF signal containing the audio information. Consequently, the presence of broadband interference is quite similar to physically relocating the transmitter to a much farther distance from the receiver. This increases the probability that the transmitter is at the fringe end of range. However, this also increases the probability that a null will cause the RF power to fall below the interference noise level and thus below the squelch level. In either case, the AMC algorithm may reduce the severity of the mutes that occur due to interference.

While FIG. 1 depicts the application of the AMC algorithm to real-time processing of a wireless microphone system, the AMC algorithm may be used in forced gaps in audio such as wireless channel frequency changes as well as incorporated in other types of communication systems. For example, embodiments may be directed to concealing audio errors caused by data errors in a real-time digital data stream, cellular telephone audio error mitigation, satellite radio audio error mitigation, and audio storage error mitigation (e.g., CD, DVD, MP3, and the like).

Figure 2:
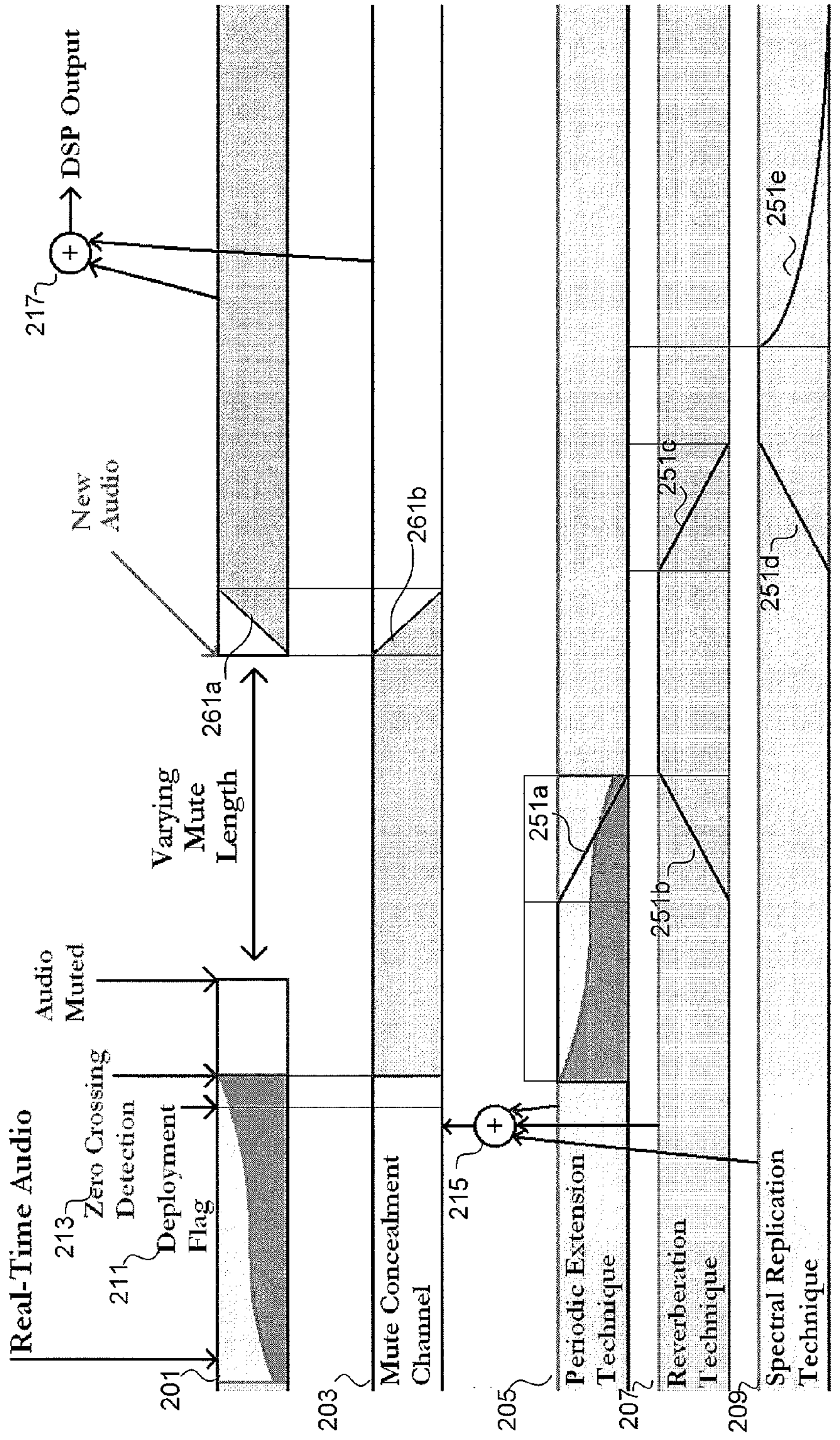
FIG. 2 shows an execution diagram of an audio mute concealment (AMC) algorithm in accordance with aspects of the disclosure.

FIG. 2 shows an execution diagram of an audio mute concealment (AMC) algorithm in accordance with aspects of the disclosure. The AMC algorithm exploits the human auditory system and the content of the input audio to fill-in muted sections of audio signal 201 with perceptually transparent audio content contained in concealment signal 203. Audio content is often considered to be stationary when considering short time periods. The AMC algorithm uses this knowledge to fill the muted interval, where the beginning is indicated by deployment flag 211, with audio concealment signal 203 that is very similar to the audio just prior to the mute. In some embodiments, the deployment flag may need to be indicated in advance of the audio mute to provide a small look-ahead for the concealment algorithm. In other embodiments the audio may be degrading gracefully and advance indication is not necessary for the concealment algorithms to process. With some embodiments, individual concealment techniques (shown as periodic extension technique 205, reverberation technique 207, and spectral replication technique 209) are deployed in a particular sequence during a mute interval and with particular timing depending on the mute length, where the outputs corresponding to each concealment technique are added by adder 215 to obtain concealment signal 203. Concealment signal 203 is then added to the muted incoming audio signal 201 by adder 217 during the mute interval in order to conceal the mute. The cascaded timing allows the AMC algorithm to operate on any mute length that is less than its maximum mute length effectiveness.

Periodic extension concealment technique 205 utilizes a reversed buffered extension of audio signal 201 by buffering audio samples prior to the mute interval. When the mute occurs, the audio samples are played in reverse. Because audio signal 201 is often sufficiently stationary for short amounts of time allows periodic extension concealment technique 205 to reverse the audio content with a low probability of the listener perceiving reversal of the audio content. A reversed buffer is used rather than a repetition buffer to reduce switching artifacts, to eliminate the need for pitch period matching, and to create a smoother transition from the non-muted audio to the audio concealment.

Triggering periodic extension concealment technique 205 on zero crossing trigger 213 and executing the extension with flipped polarity, as will be further discussed, may often insure a seamless transition. To find a zero crossing, it may be necessary to buffer the audio stream if the audio mute event cannot be anticipated as will be further discussed. Also, techniques of extending the audio to find a zero crossing could be used as will also be further discussed.

Reverberation extension concealment technique 207 may utilize a completely wet reverberation algorithm. Digital reverberation is often a very long and integrated set of reflections of the buffered audio signal before the mute interval. The original buffered audio content is reverberated, or extended in time, giving the perception that the audio content just prior to the mute is simply extended into the muted region. For very short mute amounts, technique 207 is typically not as effective as periodic extension technique 205 because some dissimilarity to the audio prior to the mute interval exists due to filtering and coloration of the audio content when applying reverberation. Additionally, since the reverberation effect is a very commonly perceived audio phenomenon, technique 207 is not typically used for a very long mute length. If the reverberation tail is allowed to trail for a long time, the reverberation may become perceptually apparent to a user and the perceptual illusion of uninterrupted audio is lost. The reverberation extension concealment technique 207 is then best suited for mute intervals of about 30 ms to 100 ms.

Spectral replication concealment technique 209 operates on a similar premise to reverberation extension. However instead of using a time domain technique with coloration effects to extend the audio, technique 209 operates directly in the frequency domain. A Fast Fourier Transform (FFT) is used to analyze the spectral contents of the audio just prior to the mute. During the mute interval, a phase randomization is applied to the FFT data. When the inverse FFT is taken, the randomized FFT phase causes the spectral components of the original FFT to be present throughout the FFT window. Consequently, the spectrum of the concealment signal over the time window is smeared throughout the window and is played back with a relatively constant time domain envelope, resulting in a spectral replicated window of time with high correlation to the frequencies present just prior to the mute interval. This window of spectral replication is repeated until the mute interval ends or until a specified time to fade into silence. Unlike reverberation extension concealment technique 207, spectral replication technique 209 typically does not introduce immediately recognizable artifacts. The concealment signal provided by spectral replication technique 209 is dissimilar to anything that occurs naturally. However, it may not without its own artifacts. In addition to the original frequencies, additional noise that is typically not objectionable may be added due to the spectral leakage of short time FFT bins, particularly if a small FFT window is used. Additionally, the ear is highly sensitive to repeated sounds. When the spectral replication is repeated many times, it may be possible to perceive the buffered repetition. However, with some embodiments, it may be possible to design the buffer length and effective concealment length such that this repetition is not a major concern.

If the mute interval is shorter than a predetermined time and thus ends before all of the concealment techniques are activated, the concealment channel is phased out and the audio signal is phased in. The remaining concealment generators are not activated so that the audio signal can resume as before the mute interval.

With some embodiments, external flag 211 triggers deployment of the AMC algorithm. However, with some embodiments it is possible to bring the deployment decision within the AMC algorithm. If the decision were made based on non-audio parameters such as RF signals, many parameters may be needed on which to base a decision; however, it may not be practical to bring all the parameters into the processor for some embodiments. On the other hand, it may also be possible to allow the AMC algorithm to determine the mute interval based on the actual audio signal. A greater latency time may be necessary and consequently less precision and confidence may be available when determining the occurrence of mute intervals based on audio level decisions.

Before concealment signal 203 may be processed, audio signal 201 may be buffered and conditioned. With the embodiment shown in FIG. 2, buffered audio samples are obtained to perform zero crossing detection in the audio stream 201. When a mute interval is triggered, a certain amount of time is provided, by techniques such as latency inducing buffering, advanced indication of the mute by the parent system, or by ensuring that the degradation of the audio is slower than the certain amount of time needed, to find the zero crossing before applying periodic extension concealment technique 205. Audio stream 201 may be delayed by this amount to give the algorithm 'look ahead' time as well as insure that actual mute in audio stream 201 does not manifest itself in the delayed audio path before periodic extension concealment technique 205 is applied.

A DC filter may be also applied to the audio stream due to the unknown conditions of the audio input to AMC. The DC filter increases the probability that the zero crossing that triggers the periodic extension will occur on a true, unbiased, symmetric audio-level zero crossing. In other words, the zero crossing should be at a point of positive/negative symmetry in the waveform such that after periodic extension, there isn't a change in DC component than before the transition.

An exemplary transfer function of the DC filter is shown in Equation 1.

$$H(z) = \frac{1 - z^{-1}}{1 - 0.995z^{-1}} \quad \text{(EQ. 1)}$$

The switch from the audio input to reversed periodic extension concealment may be initiated at a zero crossing to enhance transparency of the concealment signal 203. However in order to ensure a zero crossing for any given frequency content, delay may be added to the audio input to encounter the zero crossing before the audio is needed to be muted. The mute trigger may occur at any point of the audio wave period. In the worst case, a mute may occur just after a zero crossing in the waveform. This means that a maximal amount of time is needed before the next zero crossing. This worst-case amount of time possibly corresponds to the half-period of the wave. Low frequencies have the longest wavelength; consequently, the mute may occur just after the zero crossing of a 20 Hz waveform, for example. The period of a 20 Hz waveform is 50 milliseconds and the half period is 25 milliseconds. In order to insure the most flawless periodic extension concealment, 25 milliseconds of audio delay may be necessary. However, this latency is often unacceptable for real-time, live audio applications, and consequently a compromise of zero crossing detection confidence and audio delay may be made. There are often diminishing returns on adding audio delay to guarantee lower frequencies. Typically, the requirements of the system using the AMC algorithm set the amount of acceptable delay.

Due to the harmonic and complex spectrum of typical signals, it may be likely that even if there is frequency content below the guaranteed frequency, there may still be a zero crossing before the end of the given audio delay. The mute may occur at any point in the waveform, well after a zero crossing and even just prior to the next zero crossing, thus leading to scenarios of flawless period extension of low frequencies with short delay amounts.

In some embodiments, a self-prediction technique may be used to provide audio to the zero crossing detector without the need of delay buffering. An adaptive linear predictor is included that is designed to adapt to the incoming audio such that is capable of predicting the current sample based only on a set of audio samples that occur in the past. A variety of predictors can be used which include but are not limited to a Least Mean Squared (LMS), Recursive Least Squares (RLS), or Autocorrelation block prediction using Levinson Durbin Recursion. When the audio mute indication is received, the output of the linear predictor is fed to the input of the linear predictor causing the predictor to be self-excited. Additionally, the adaptation of the linear predictor coefficient calculation is paused so the frequency response of the prediction filter is preserved at the time of the audio mute. If the frequency response of the prediction filter is well matched to the response of the signal just prior to the mute, the self-excited prediction loop will continue the frequency content for a short amount of time. During this time a zero crossing can be detected and the periodic extension technique can be applied.

Figure 3:
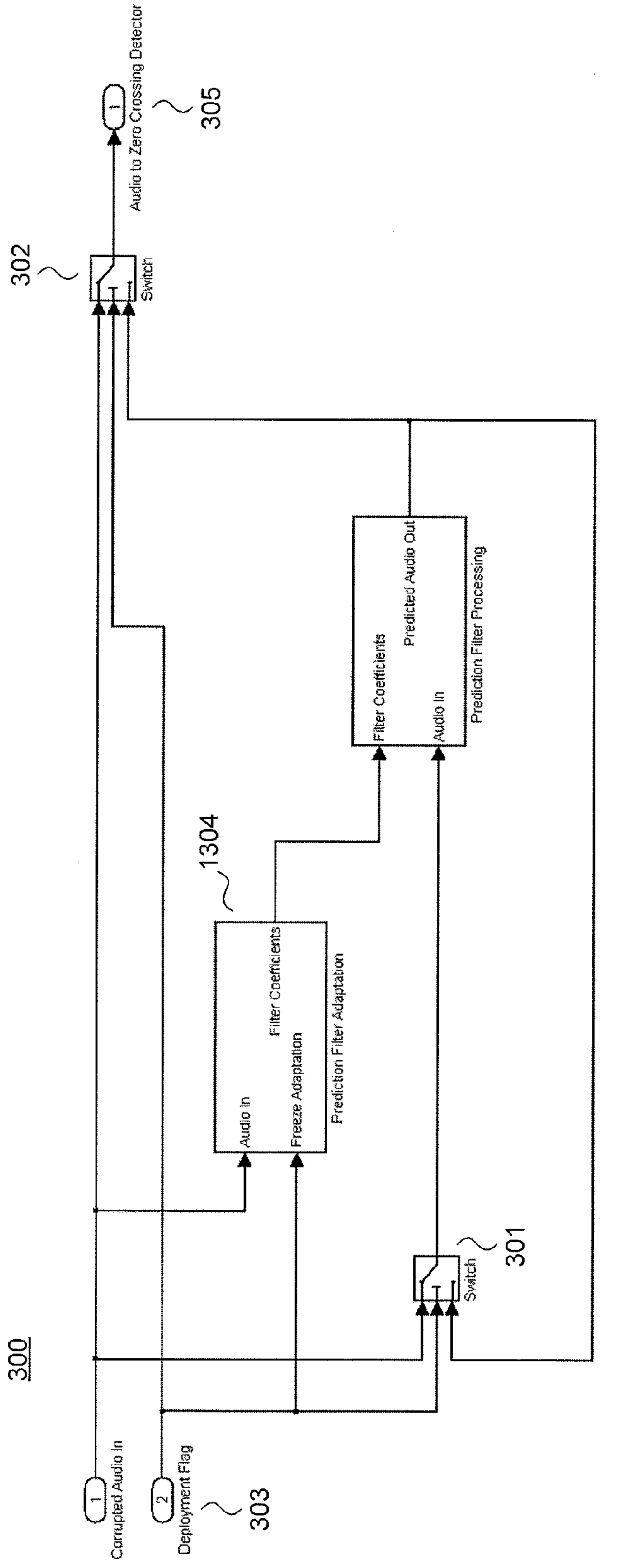
FIG. 3 shows a block diagram of the application of the self-predictive loop during an audio mute in accordance with aspects of the disclosure.

FIG. 3 shows a block diagram of the application of the self-predictive loop during an audio mute. Switches 301 and 302 create the self-prediction loop as well as pass the predicted audio when the deployment flag 303 is received. The linear predictor coefficient adaptation 304 is paused when the audio is muted. The linear predictor 305 filters audio samples that are fed back to itself during this time and then send the result to the zero crossing detector 305.

Figure 4:
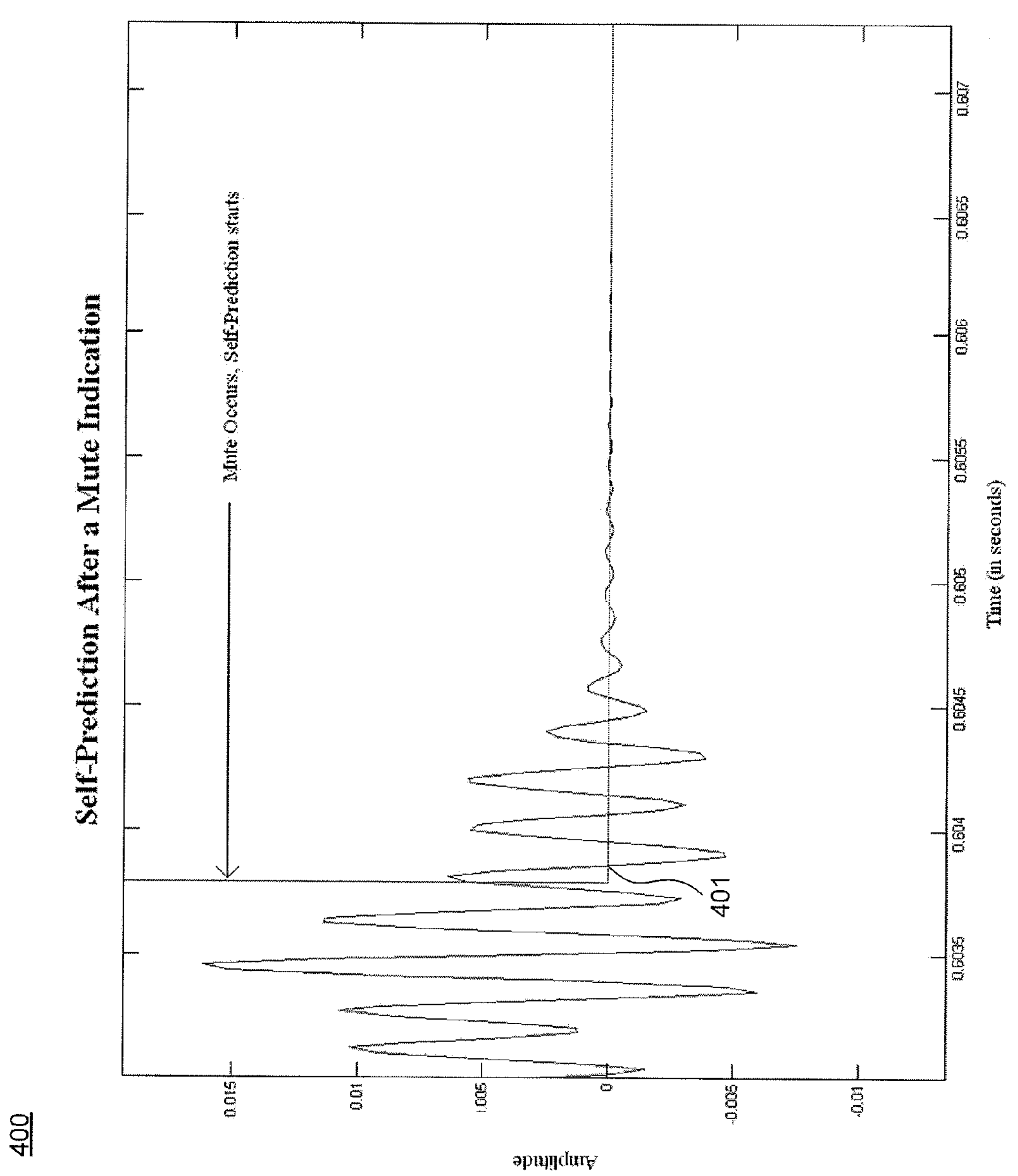
FIG. 4 shows an example of the self-prediction technique in accordance with aspects of the disclosure.

FIG. 4 provides example of the self-prediction technique. When the mute indication is received, the audio is self-predicted. In most cases, the prediction filter does not match the frequency content of the audio very precisely, causing signal energy to be dissipated as can be seen in 400. The self-prediction in this example lasts for about one millisecond. In many cases this may be enough time to find a zero crossing with which to apply the periodic extension concealment technique. It is unlikely that the self-prediction would provide sufficient signal energy for much longer than the time range of milliseconds. Its effectiveness will depend highly on the signal characteristics as well as the chosen linear predictor and its order. This example self-predicts sufficiently for zero crossing detection as the periodic extension concealment technique would occur at the first zero crossing at 401. If the self-prediction technique does not provide a zero crossing in a desirable amount of time, other techniques may need to be used to force a zero crossing as described below.

With some embodiments, zero crossing detection may be insured if the audio content is altered during the amount of time between the mute trigger and the designed delay amount. The audio samples may be windowed by a tapering function after the mute trigger to force a zero crossing detection by the end of the delay window. If a buffer delay is not used in the case of the mute signal anticipating the actual need for the more, buffer window tapering may be bounded by the anticipation of the mute rather than the buffer delay amount.

Buffer window tapering may reduce the amount of audio delay necessary to engage periodic extension concealment technique 205 (as shown in FIG. 2) with minimal audio artifacts. The audio samples are directly multiplied with the window. For a period of time, the window gain is unity so that it is possible to obtain zero crossing detection without altering the audio content. Afterwards, the gain factor is ramped down from unity to zero and on the next sample to a negative number. The negative number may be necessary to create an actual zero crossing and not just a zero result.

The addition of this gain ramp may alter the audio content, creating possible artifacts. Amplitude Modulation (AM) results when an audio signal is multiplied with the taper function. Modulation side bands around the frequencies present in the audio signal are manifested during the taper function and for the same amount of time after the periodic extension engages since the audio content is played in reverse. A typical taper is between 0.25 milliseconds and 0.5 milliseconds. Even after application of periodic extension concealment, this total AM event lasts from 0.5 milliseconds to 1 millisecond and is unlikely to be objectionable.

Typically, the shorter the taper becomes, the more discontinuous the event is. For example, with a taper of only 1 sample, if the audio sample just prior to periodic extension engagement were 0.75, the next sample results as an output value of −0.75, creating a click-like event. A click is an audible impulsive event and generally has a very 'white' spectrum. It may be viewed that when extending the taper longer than 1 sample, the discontinuity is processed by a low pass filter (LPF). As the taper increases, the LPF cutoff frequency is reduced a lower value, thus reducing the effects of the discontinuity. Typical buffer window tapering is less than 1 ms causing possible artifacts that are filtered by a cutoff frequency of 500 Hz.

Figure 5:
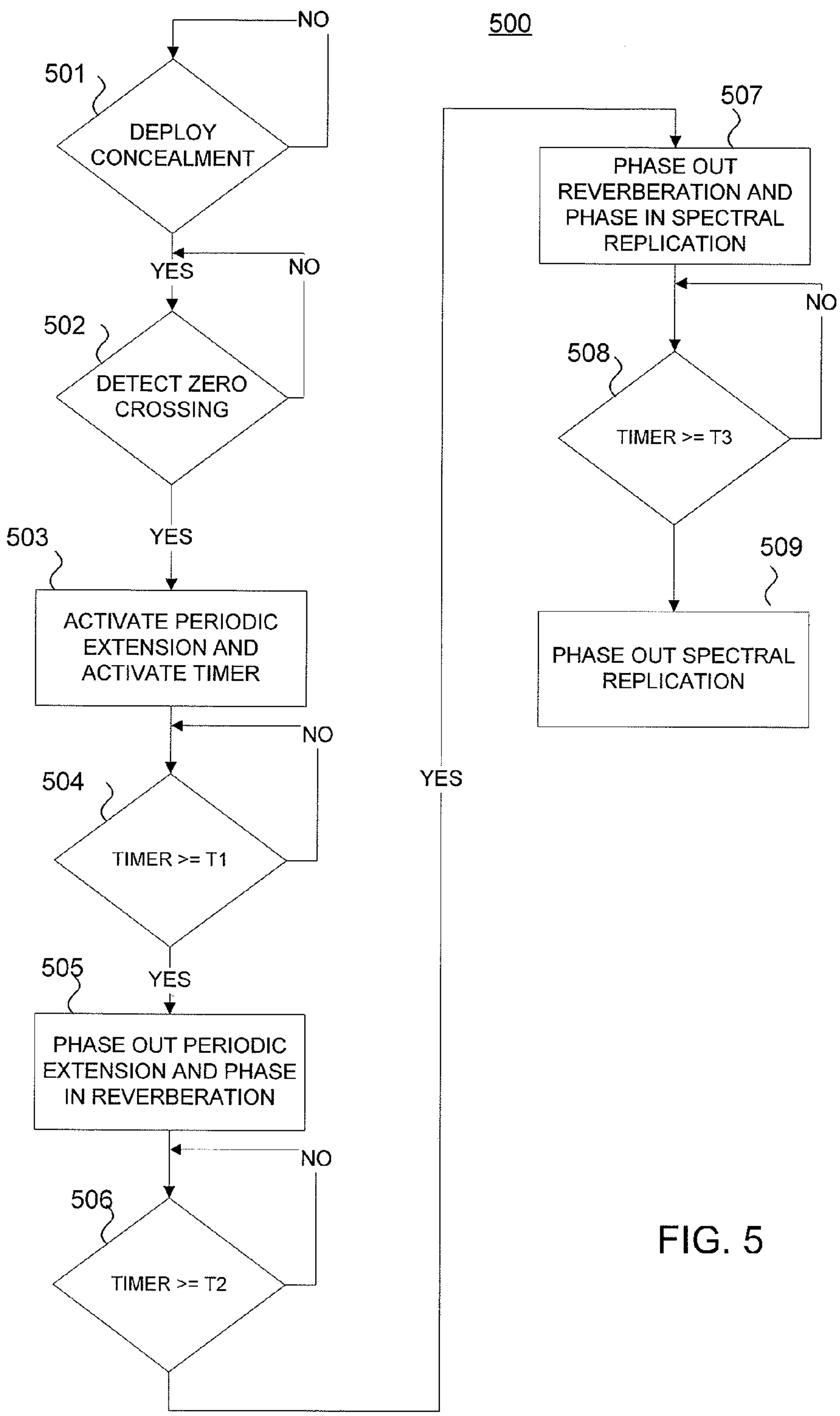
FIG. 5 shows a flow diagram of an audio mute concealment process in accordance with aspects of the disclosure.

FIG. 5 shows flow diagram 500 of an audio mute concealment process in accordance with aspects of the disclosure. Block 501 determines that concealment should be deployed based on a mute indicator, e.g., deployment flag 211. When a zero crossing of the audio signal is detected in block 502, block 503 activates the periodic extension concealment technique as well as a concealment timer, which activates subsequent concealment events.

When block 504 determines that a predetermined time interval has expired (T1), the periodic extension concealment technique is phased out and the reverberation concealment technique is phased in (corresponding to 251*a* and 251*b*, respectively, as shown in FIG. 2) at block 505. When block 506 determines that a second predetermined time interval has expired (T2), the reverberation concealment technique is phased out and the spectral replication technique is phased in (corresponding to 251*c* and 251*d*, respectively, as shown in FIG. 2) at block 507. If the mute interval continues and block 508 determines that a third predetermined time interval has expired (T3), then the spectral replication technique is phased out (corresponding to 251*e* as shown in FIG. 2) at block 509.

Figure 6:
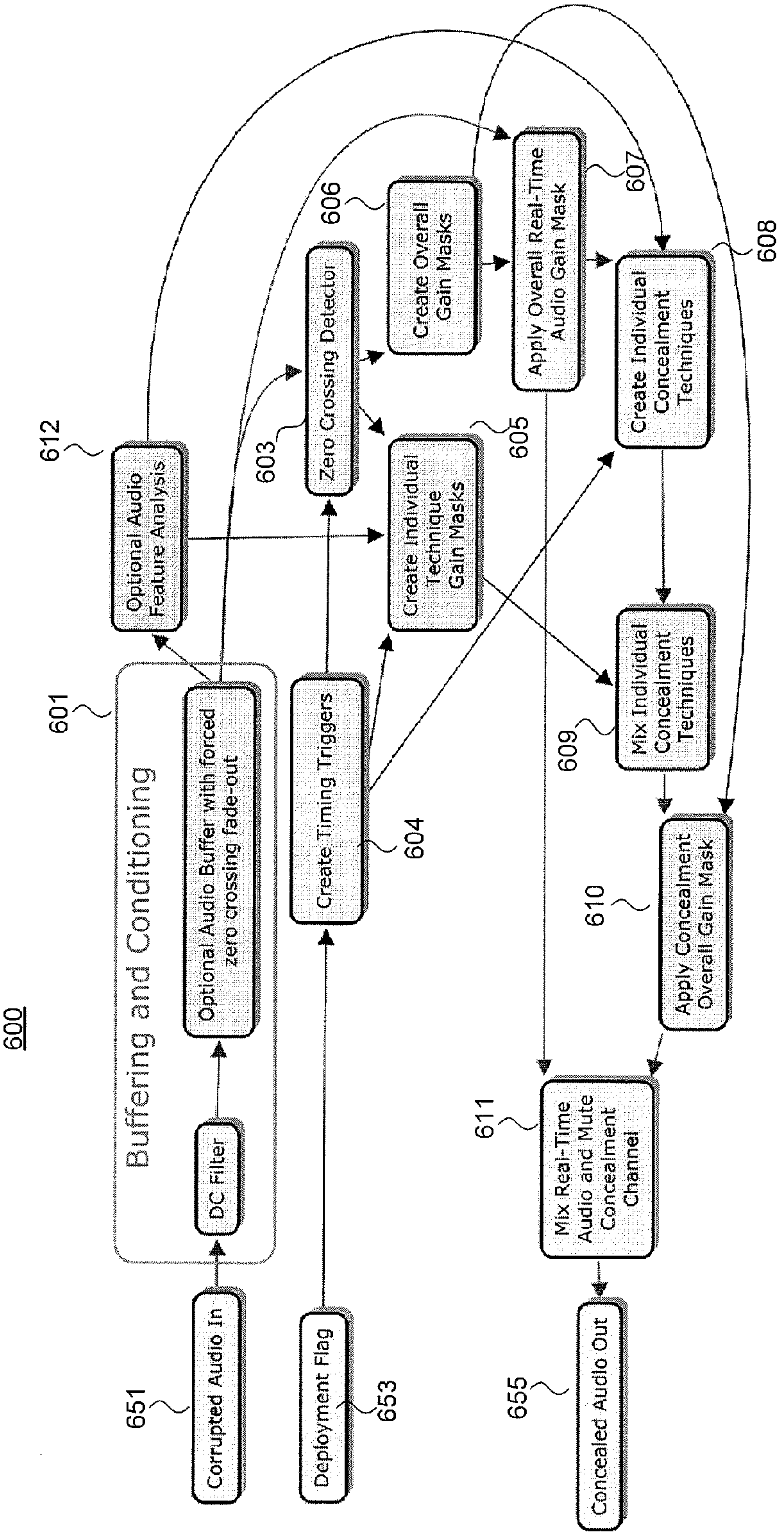
FIG. 6 shows an audio mute concealment block diagram in accordance with aspects of the disclosure.

FIG. 6 shows audio mute concealment block diagram 600 in accordance with aspects of the disclosure. After the pre-AMC audio buffering and conditioning 601, processes and processes 608 and 609 are executed for generating concealment signal 203. Each function may be performed by its own subsystem:

- Muting State Machine and Trigger Creation 604
- Zero Crossing Detector 603
- Global Gain Mask Calculation and application to incoming audio 606, 607, and 610
- Individual Technique Gain Mask Calculation 605
- Audio Concealment Techniques 608
  - Periodic Extension
  - Reverberation Concealment
  - Spectral Replication
- Individual Technique Mixing 609
- Global Audio Mixing 611
- Audio Feature Analysis 612

Block diagram 600 processes corrupted audio signal 651, which contains portions that may be muted as indicated by deployment flag 653, so that a concealment signal is added during the mute intervals of corrupted audio signal 651 to produce concealed audio signal 655. As will be further discussed, deployment flag 653 initiates the creation of timing triggers 604 to create and apply gain masks to the concealment signal produced by different concealment techniques.

Figure 7:
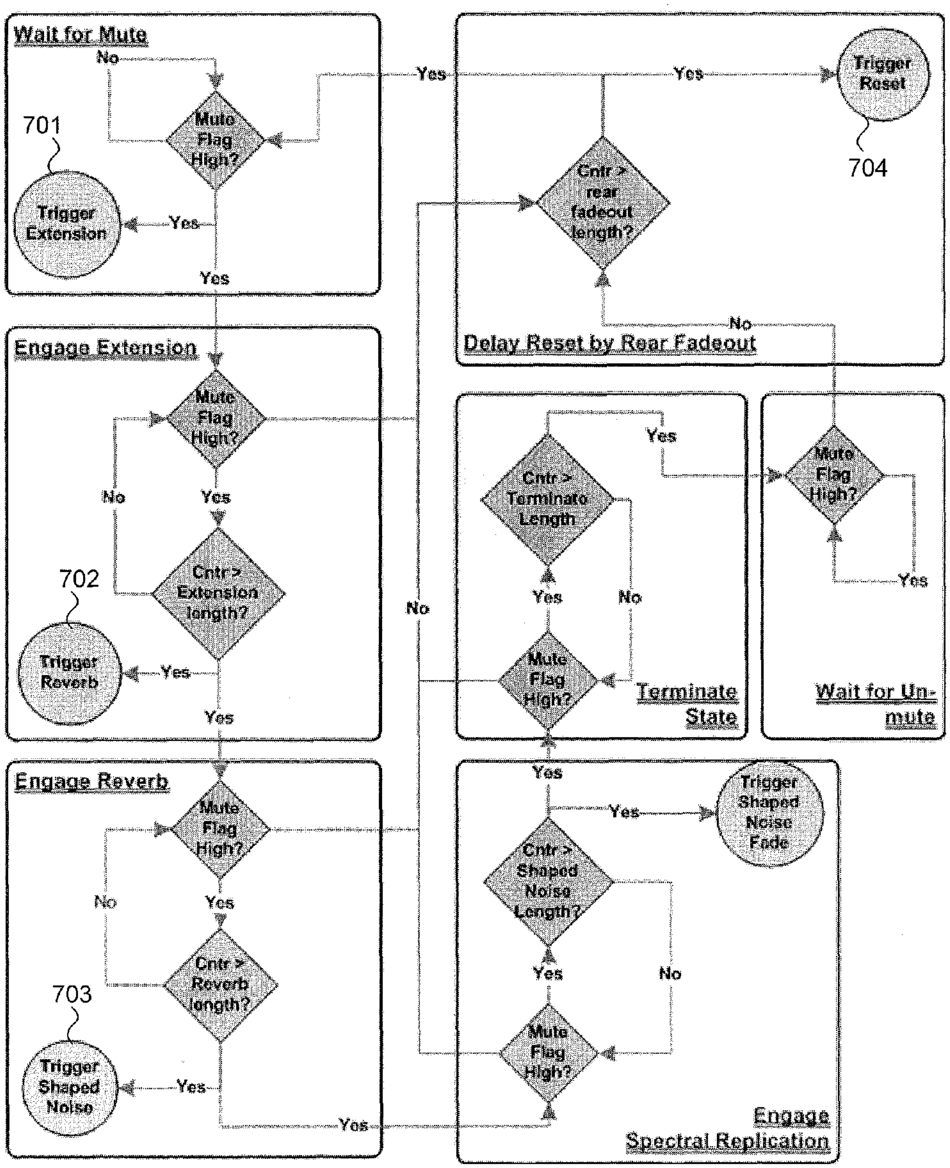
FIG. 7 shows an audio mute concealment state machine in accordance with aspects of the disclosure.

FIG. 7 shows an audio mute concealment state machine in accordance with aspects of the disclosure. As shown in FIG. 2, after the mute flag goes high (indicative of the continuation of the mute interval) and as time progresses, different concealment algorithm states are tracked in order to process the proper audio concealment event. When the mute flag returns to zero, the muting state machine triggers a cross-fade back into the audio stream, sends a reset command to each downstream subsystem, resets the state machine, and waits for a new mute.

With some embodiments, each audio concealment technique and other execution subsystems are engaged by a single shot, one bit trigger. The trigger signals are sent when the state machine changes from one state to another. The trigger corresponding to each state may be sent just prior to entering the state. Each state allows the machine to test a different condition before sending the trigger signal and proceeding to the next state.

FIG. 7 shows a general view of the state machine used to trigger the audio concealment techniques. The state machine generates different trigger signals during different states. Extension trigger 701 enables the zero crossing detection. The zero crossing detector outputs a zero crossing trigger that actually enables the periodic extension technique. Reverb trigger 702 triggers the reverberation concealment technique. Spectral replication trigger 703 triggers the spectral replication concealment technique. Reset trigger 704 resets all state machines and gain masks so that the system is immediately ready for the next mute interval.

With some embodiments, if the mute flag goes low before zero crossing detection triggers, then the mute may just pass or a regular buffer may be played in the case of digital wireless type errors. The perform extension flag may be set back to 0 (it usually waits the full periodic extension length every shot) if the mute flag goes low before the periodic extension timer expires. If the previous mute flag drop is less than a minimum time duration (e.g., 30 milliseconds), then the mute concealment may immediately activate the reverberation technique because the reverse buffer may be corrupted.

The zero crossing detector searches a change from a positive to a negative value or vice versa when the zero crossing detector is enabled in the zero crossing state machine. The zero crossing detector uses extension trigger flag 701 as a primary input. By default, the machine is in the 'wait for extension trigger' state. When extension trigger 701 goes high, the machine is progressed to 'find zero crossing' state and checks the audio input for a zero crossing. When one is detected, the zero crossing trigger is triggered high to start the periodic extension. Afterwards, the machine goes into the 'wait for reset' idle state. For either the idle state or in 'find zero crossing' state, if reset trigger 704 or reverb trigger 702 goes high, the machine returns to 'wait for extension' state.

With some embodiments, the engagement of audio mute concealment as well as application of the various mute concealment techniques while engaged is processed by gain masks. Each stream of audio is running, but only certain audio streams are allowed to pass and be mixed to the output at any given time. The gain masks 251*a*, 251*b*, 251*c*, 251*d*, and 251*e* for different concealment components are depicted in FIG. 2.

The audio and concealment channel masks are the master switching control for the algorithm. When a zero crossing engages periodic extension, the gain of the incoming audio is immediately switched from 1 to 0. At the same time, the gain of the concealment channel, which is master gain control for the mixed audio concealment techniques, is switched from 0 to 1. This occurs rather than a cross-fade between the channels; the switch may be instantaneous due to the event occurring at a zero crossing. At the end of a mute, the process of returning to streaming audio is typically not instantaneous. The rear cross-fade parameter controls the length of a linear cross-fade 261*a* and 261*b* back into live incoming audio.

Each individual audio concealment technique is given its own gain mask in order to change how the audio is being filled-in as a function of time. Each concealment technique has a concealment length and possibly a cross-fade to the next concealment parameters. The cross-fades are typically linear (corresponding to gain masks 251*a*, 251*b*, 251*c*, and 251*d*) with the exception of the termination of the final concealment technique, which in this illustrative embodiment is spectral replication, technique (corresponding to gain mask 251*e*). Since the termination of the spectral replication goes to silence it is not a cross-fade, but rather a fade out. The fade is logarithmically shaped rather than linearly so that it is fading out linearly in decibels, the same way that the ear/brain system perceives amplitude changes.

The logarithmic fade-out 251*e* may be computed using a computationally efficient first order averager structure. The parameter alpha may be computed using Equation 2.

$$\text{Alpha} = \left(1 - 10^{\frac{-DGdB}{20}}\right)^{\frac{1}{fs*Tc}} \qquad \text{(EQ. 2)}$$

where DGdB=the destination gain in decibels chosen to be very minimal (0.1), fs=the sample rate of the system, and Tc=the desired time to reach the destination gain The calculation of each individual concealment technique mask may consider the number of triggers and generates a gain mask based on state machines. The state machine outputs a flag that is sent to a gain mask calculation block that fades in and out the concealment technique based on AMC parameters.

The individual gain mask parameters control how much time is spent in each individual concealment technique to construct the total AMC algorithm. These parameters control the shapes of the gain masks as shown in FIG. 2.

Adjusting these parameters affects the quality of the AMC algorithm. These parameters are chosen based on the characteristic of the audio to be concealed and the use case in which the concealment is anticipated to be used. For example, one illustrative embodiment is configured with the following parameter values.

- Exclusive Periodic Extension: 25 milliseconds
- Cross-fade Periodic Extension to Reverberation: 55 milliseconds
- Exclusive Reverberation: 120 milliseconds
- Cross-fade Reverberation to Spectral Replication: 30 milliseconds
- Exclusive Spectral Replication: 120 milliseconds
- Termination Fade-out: 150 milliseconds In some embodiments, there may be an audio characteristic detector 612 (as shown in FIG. 6) that will analyze the audio features prior to the mute interval and alter the individual mask parameters based on the qualities of the incoming audio. For example, different parameters may be chosen if the audio event just prior to the concealment is impulsive versus tonal. In some cases entire techniques could be eliminated altogether or new or different techniques chosen. For example an impulsive event may eliminate the periodic extension technique completely.

In some embodiments, the audio characteristic detection, also known as an audio feature analysis, may comprise of a slow and fast time domain audio envelope detector. When the energy levels of the fast and slow detectors differ by a threshold, the signal is considered impulsive and the periodic extension technique may be bypassed. Another audio feature analysis includes signal autocorrelation or some other form of periodicity measurement. Upon decision of a tonal or periodic signal, the length of periodic extension may be extended or the spectral replication concealment technique may be favored over the reverberation concealment technique.

Each audio concealment technique is individually processed based on the corresponding trigger from the muting state machine.

Figure 8:
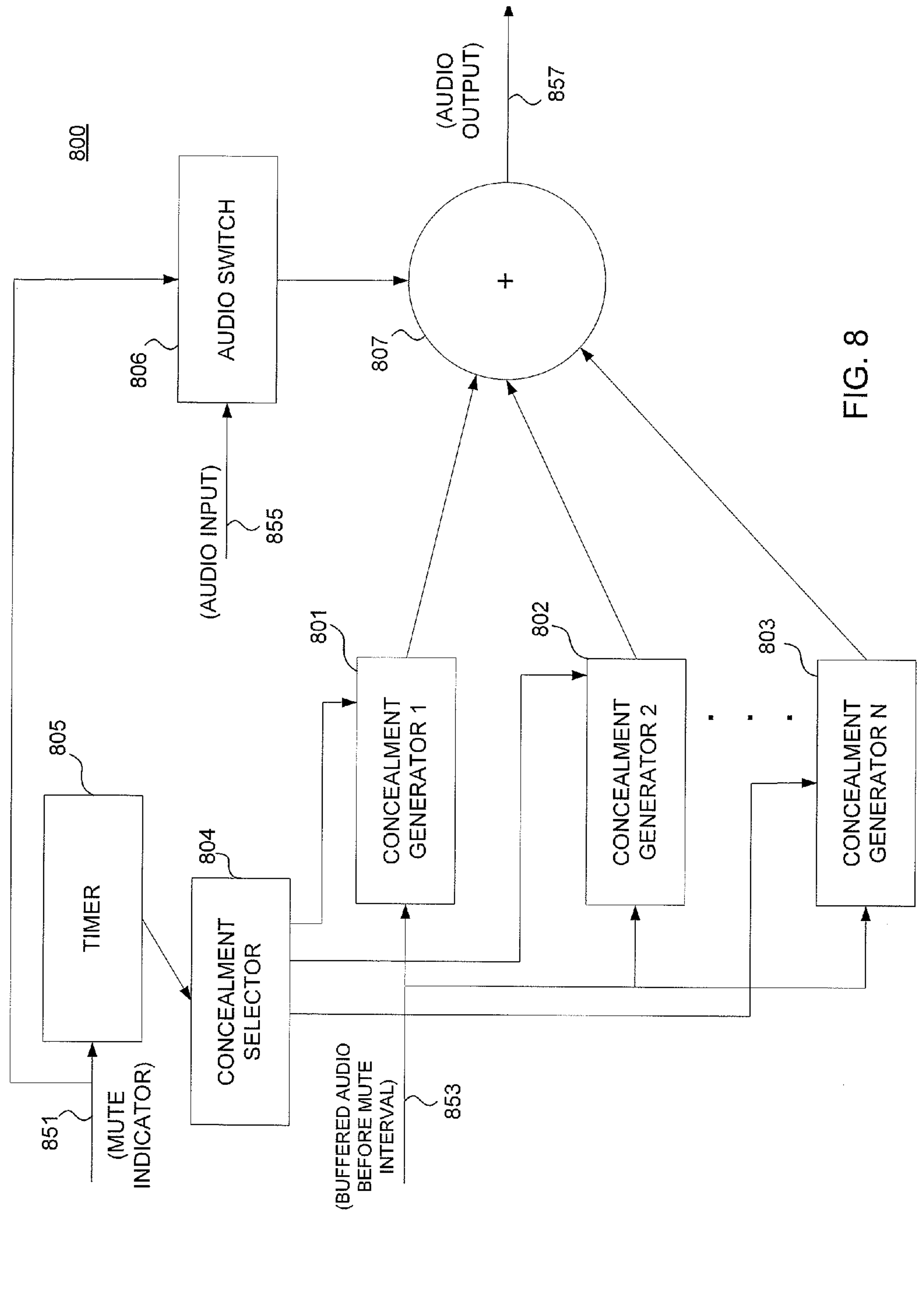
FIG. 8 shows an apparatus that supports audio mute concealment in accordance with aspects of the disclosure.

FIG. 8 shows apparatus 800 that supports audio mute concealment in accordance with aspects of the disclosure. Apparatus 800 conceals mute intervals of audio input signal 855 by adding a concealment signal generated by concealment generators 801-803 to audio signal 855 when muted. In order to form audio output signal 857, audio switch 806 passes audio input signal 855 when unmuted while blocking audio input signal 855 and injecting the concealment signal during mute intervals.

Mute indicator 851 (e.g., deployment flag 211) initiates timer 805. Concealment selector 804 uses time information from timer 805 to activate selected concealment generators 801-803 at predetermined time intervals. While the embodiment shows three concealment generators, where each utilizes a different concealment technique, other embodiments may use a different number of concealment generators that may be less than or greater than three.

When activated, the selected concealment generator processes buffered audio samples 853, which are typically captured just before the mute interval, in accordance with the concealment technique. The outputs of generators 801-803 are added by adder 807 to form the concealment signal. As previously discussed, the output of the previously activated concealment generator may be phased out while the output of the currently activated concealment generator may be phased in so that outputs from two generators are added during transition times to obtain the concealment signal.

Figure 9:
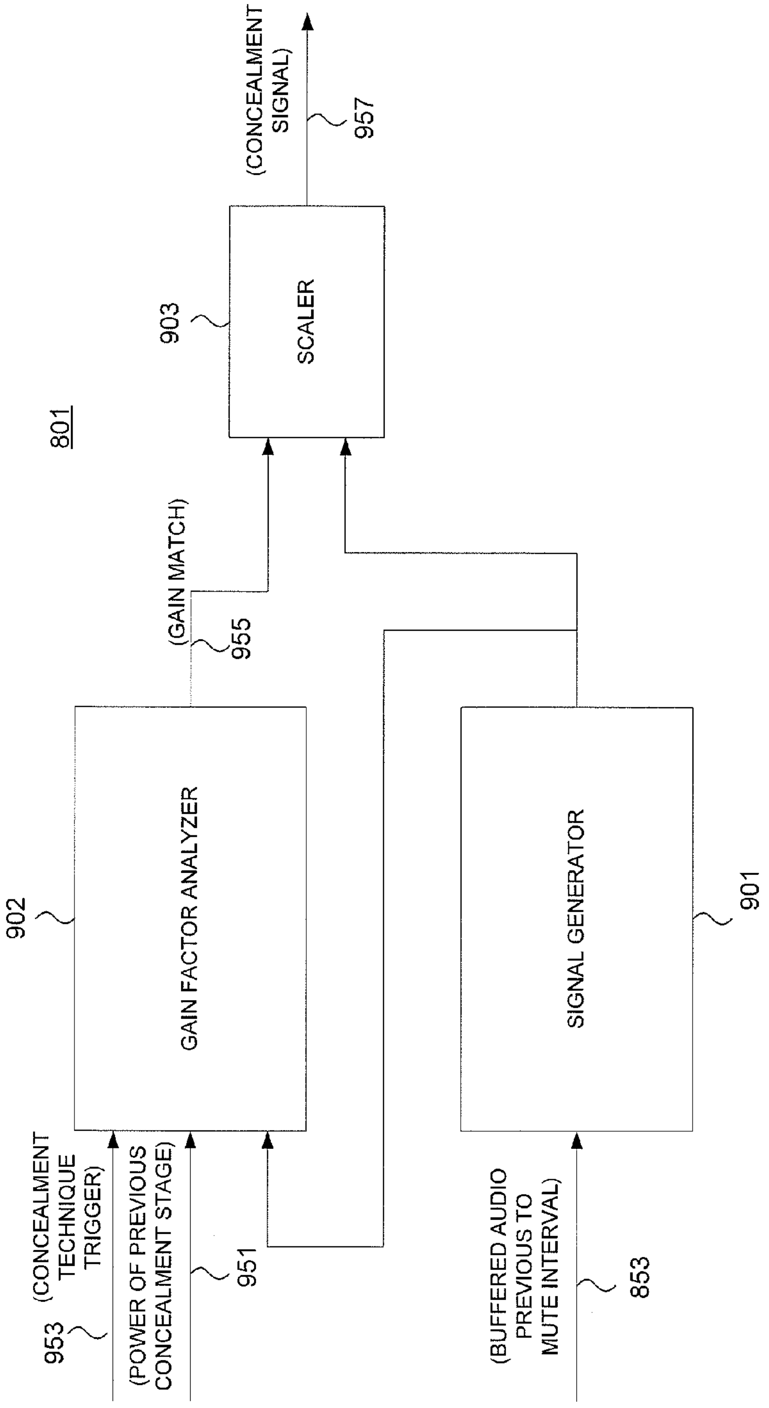
FIG. 9 shows a block diagram of a concealment generator in accordance with aspects of the disclosure.

FIG. 9 shows a block diagram of a concealment generator (e.g., generators 801 as shown in FIG. 8) in accordance with aspects of the disclosure. Signal generator 901 forms a concealment waveform by processing buffered audio samples 853. Gain factor analyzer 902 adjusts the amplitude of the concealment waveform in order to match the power level of the audio signal before muting (if the first activated concealment generator) or the power level of the concealment signal generated by the previously activated concealment generator based on power information 951. However, when generator 801 is not activated by trigger 953, analyzer 902 blocks the concealment waveform from signal generator 901 so that the value of gain match 955 is essentially zero. Gain match 955 controls output 957 of scaler 903 so that the output concealment signal has the desired power level.

Experimentation suggests that an important characteristic of effective mute concealment is to ensure that the power of the signal prior to the mute is continued without noticeable change during the mute concealment. In addition, the power between individual techniques should also be matched as closely as possible when the muting state machine changes from one concealment technique to another so that there is minimal chance of a noticeable change. The power envelope of the previous concealment output may be determined to match the next concealment technique's signal power. However, a power matching calculation is not necessary when transitioning from streaming audio to periodic extension since it uses a reversed buffer of previous samples. It is guaranteed that the power will be the same since they are essentially the same audio samples.

A different power envelope calculator and power-matching technique may be used for each concealment technique. The root mean squared (RMS) power of each technique may be approximated using simple running average calculations surrounded by a square and square root calculation. The running average is an efficient approximation to the true running mean (average) of the signal. The whole structure is then an approximation to the root mean squared (RMS) calculation, which provides a power approximation.

When the power calculation of both the previous and the new concealment technique is ready at the instant the new concealment technique is necessary, the power matching factor is a simple division described in Equation 3 to produce the applied gain factor.

$$\text{Power\_Matching\_Gain\_Factor} = \frac{\text{Power\_of\_previous\_Technique}}{\text{Power\_of\_New\_Technique}} \qquad \text{(EQ. 3)}$$

This gain factor match equation will be applied only once when the new technique is first necessary to start the cross-fade out of the old technique. The matching gain factor are calculated and then held until the technique has been initialized again due to a new mute occurring later in time.

The gain factor match is limited to a reasonable gain so that a low-level concealment technique won't be gained up too much. This reduces the chance that there is a louder than desired concealment technique due to unknown or undesired signal conditions. It also accounts for possible erroneous power calculations due to poorly chosen time constants.

Figure 10:
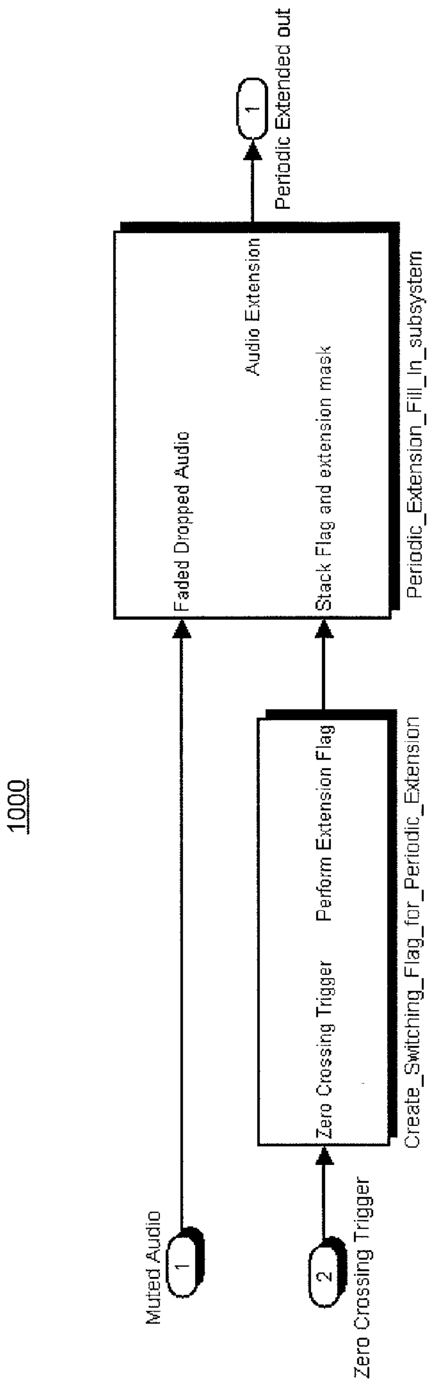
FIG. 10 shows a block diagram for a periodic extension technique in accordance with aspects of the disclosure.

FIG. 10 shows block diagram 1000 for a periodic extension technique in accordance with aspects of the disclosure. The periodic extension technique keeps a buffer of samples, e.g., approximately 80 millisecond, in a circular buffer structure. When the periodic extension flag is low, the subsystem writes incoming samples to the buffer and increments the pointer in a positive direction. When the flag goes high, the pointer reverses direction and reads out audio samples rather than writing in samples. Both the read and write functions occur once every sample period.

The perform extension flag is the input to the periodic extension subsystem to determine whether the circular buffer needs to be read from or written to. Since the input to this technique is the zero crossing trigger, a single shot trigger, the system needs to extend the trigger into a periodic extension flag for the duration of the periodic extension technique.

The circular buffer takes the streaming audio input and the periodic extension flag to determine the read/write state and pointer incremental direction.

Figure 11:
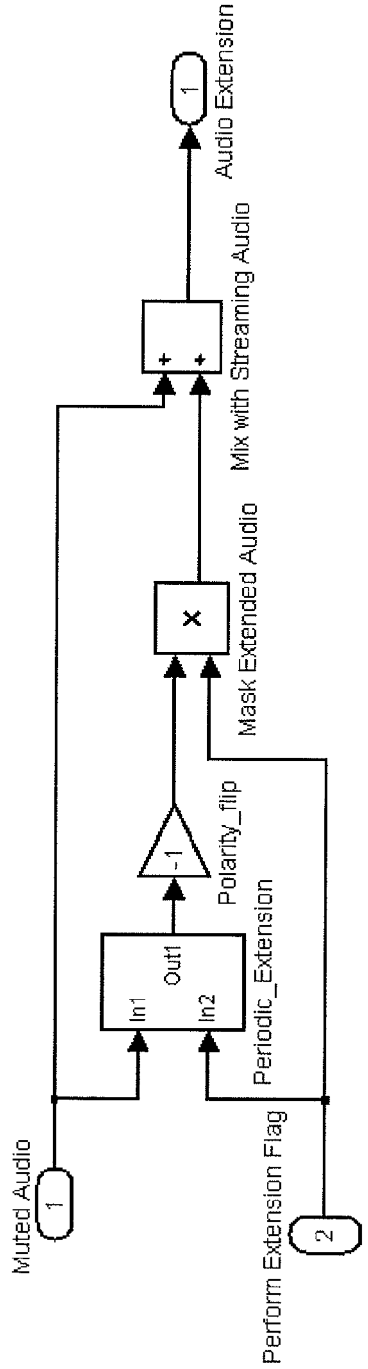
FIG. 11 shows a periodic extension concealment subsystem in accordance with aspects of the disclosure.
Figure 12:
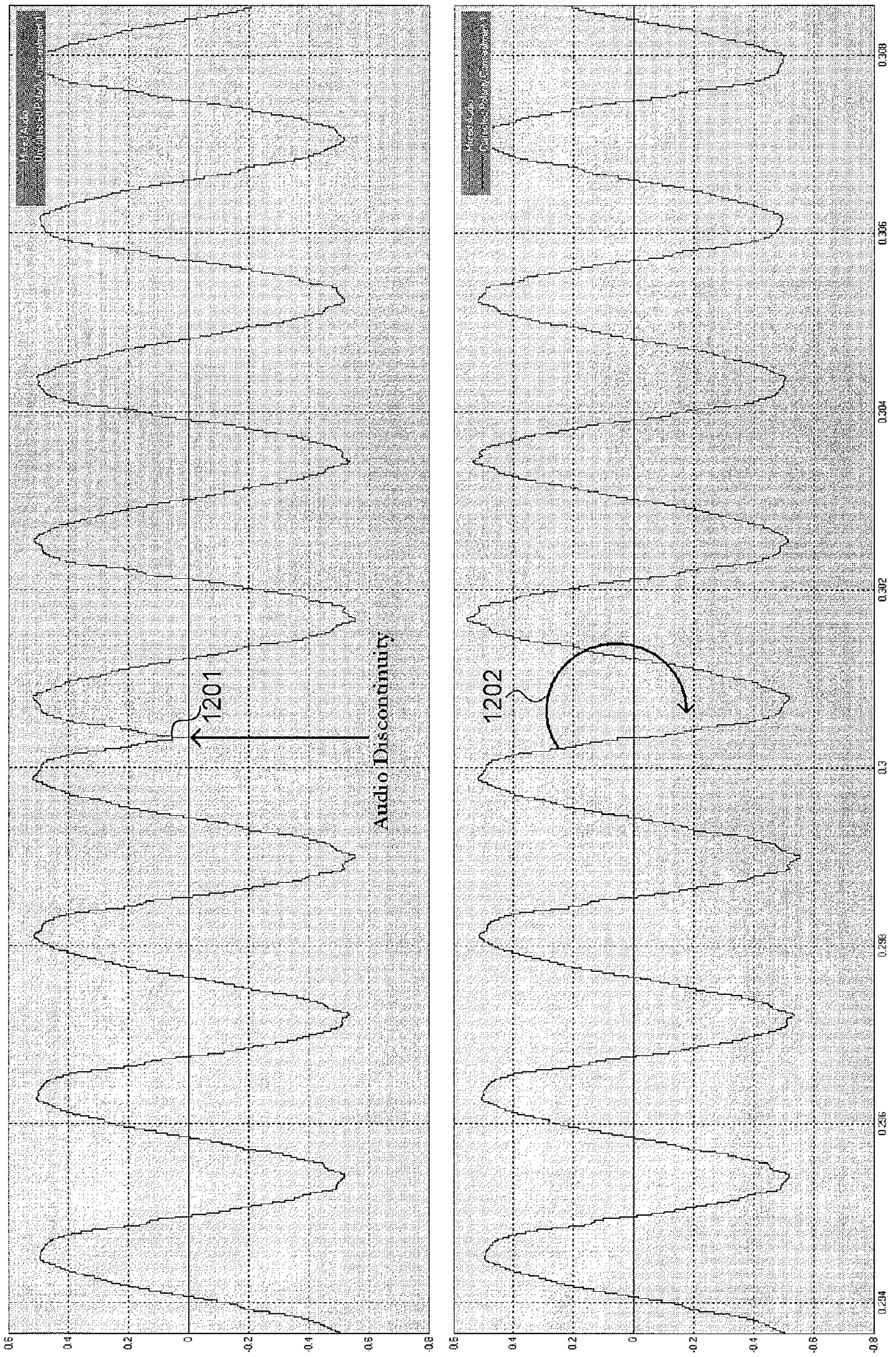
FIG. 12 shows an example of polarity flipping for periodic extension concealment in accordance with aspects of the disclosure.

FIG. 11 shows periodic extension concealment subsystem 1100 in accordance with aspects of the disclosure. Subsystem 1100 performs circular buffering. FIG. 12 shows an example of polarity flipping 1202 for periodic extension concealment in accordance with aspects of the disclosure. The output of the periodic extension is flipped in polarity so that when the samples start to get reversed at zero crossing 1201, the instantaneous slope is continuous. This creates an inaudible transition from streaming audio to periodic extension concealment.

Figure 13:
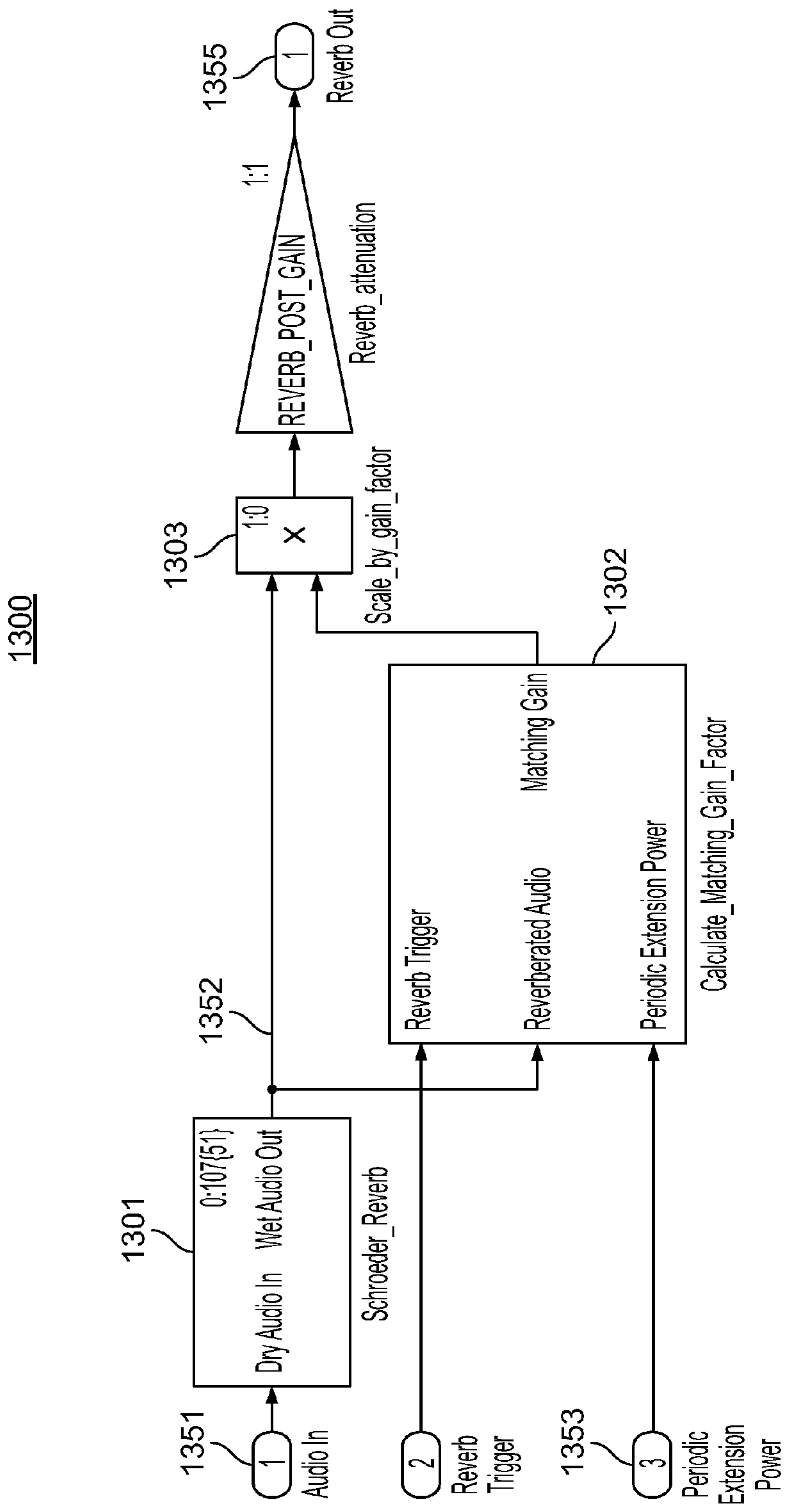
FIG. 13 shows a block diagram for a reverberation concealment technique in accordance with aspects of the disclosure.

FIG. 13 shows block diagram 1300 for a reverberation concealment technique in accordance with aspects of the disclosure. The reverberation concealment technique extends the frequency content of the audio signal just prior to the mute into the muted region. The reverberation concealment technique uses reverberation algorithm 1301, which may consist of a modified Shroeder reverberation algorithm, to reverberate the audio content prior to a mute into the muted region, where algorithm 1301 processes input signal 1351 to obtain reverberation signal 1352.

Figure 14:
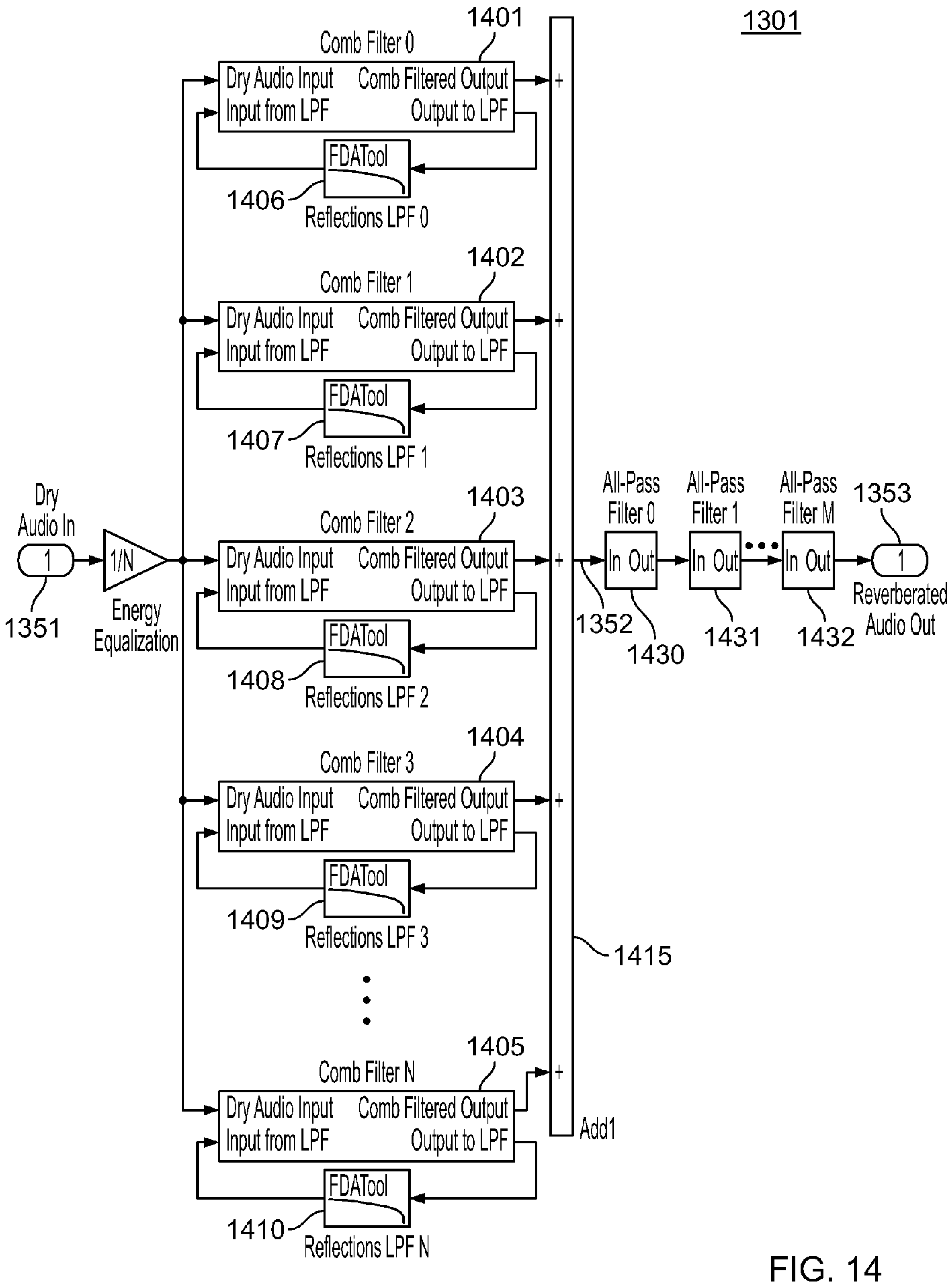
FIG. 14 shows a parallel comb filter structure followed by a series all-pass filter structure in accordance with aspects of the disclosure.

Reverberation algorithm 1301 may be a low complexity simulation of the room reflections that comprise reverberation by combining a number of parallel feedback comb filters with a number of series all-pass filters as shown in FIG. 14. The feedback comb filters create the specific and repeating echoes of the original audio that simulate the bouncing of sound among the walls in a room. The all-pass filters time smear the discrete reflections created by the comb filters to give the reverb a more realistic rather than unnatural "robotic" sound, as well as distort the phase response. Reverberation algorithm 1301 may be modified to include the addition of a low-pass filter inside of each comb filter loop. This emulates the natural low-pass filtering that occurs due to softer wall surfaces and other absorptive room objects such as carpeting and drapes. The reverberation used for concealment is an all wet reverberation because there is no non-reverberated sound present in the output nor is there a path for dry sound to propagate to the input.

Reverberation signal 1352 is scaled by scaler 1303 so that reverb out 1355 matches the power level of the concealment signal provided by periodic extension concealment subsystem 1100 in concert with power extension power indicator 1353 as processed by gain factor analyzer 1302.

FIG. 14 shows a parallel comb filter structure and series all-pass filter structure that supports a reverberation concealment technique in accordance with aspects of the disclosure. Reverberation system 1301 includes a set of N parallel feedback comb filters depicted by 1401-1405. Echoed signal 1352 is formed by combining comb echoes from filters 1401-1405 by combiner 1415. The signal on the inside of the comb filter loop is sent to the LPFs 1406-1410 that takes the edge off of the reflected echoes. If no low-pass filter is used, the result is typically a very bright reverberation. When high frequency sounds are reverberated, the human brain easily perceives the reverberation. The reverberation concealment should be as un-noticeable as possible. It is typically better to err on the side of too much high frequency attenuation rather than not having enough. Reverberation system 1301 includes a set of M series feedback all-pass filters depicted by 1430-1432. The final Reverberation Signal 1353 is the output of the all-pass filter structure.

There may be a complication by adding the low-pass filter in the comb filter loop. With some embodiments, the comb filter is a first order feedback infinite impulse response (IIR) structure. In this structure, the stability criterion is that the gain inside of the loop does not exceed one. Consequently, the pole does not venture outside of the unit circle. When another transfer function is added inside of a comb filter, the stability becomes frequency dependent rather than fully gain dependent. Consequently, if any frequency has a gain greater than one, the filter may still be unstable regardless if the comb filter pole is inside of the unit circle.

Creating an appropriate reverberation for concealment purposes is often a highly subjective and iterative design process. However, the reverberation concealment output should typically be as 'colorless' as possible. In other words, the reverb should not sound like a particular recognizable reverberation from a particular room or other indoor enclosure. If reverberation concealment sounds very dissimilar to the room in which the AMC algorithm is being used, the difference in coloration may be apparent and the illusion of mute concealment may be compromised.

With some embodiments, there are two characteristics that control the 'color' of the reverberation: the reverberation length and decay and the frequency response of the reverberation. In the case of the AMC algorithm, the length of reverberation affects how long reverberation can be used as a concealment technique as well as how natural the concealment sounds. The reverberation length is typically a less important characteristic than the frequency response. However, a long reverberation tail causes memory of frequency content that occurs too far in the past that is likely to be unrelated to the audio frequency content just prior to the mute interval.

The frequency response of a room reverberation is typically colored due to the dimensions of the room. The dimensions and shape of the room cause room modes and other more complicated constructive and destructive acoustic environment conditions that cause a non-white frequency response. The choice of delay amounts in the parallel comb filters correspond to the room shape and dimension of an actual space. If the comb filter echoes from two or more of the comb filters happen to occur at the same time, the echo at that instance in time will be amplified. The constructive interference may occur periodically at integer multiples of the instance. When the increased echo is persistent and periodic over time, the period between the echo persistence may cause an increase in the frequency content related to that period.

With some embodiments, an important consideration is that the comb delays be not only relatively prime to each other but also to have all integer multiples of the comb delays relatively prime to all other integer multiples of the comb delays so that no multiple of any other number causes constructive interference. An example design of the comb filter delays in the AMC algorithm starts with using natural prime numbers. However, integer multiples of prime numbers are not relatively prime to each other. For instance 3*2 ms=2*3 ms and 5*2 ms=2*5 ms. Table 1 shows the natural prime numbers representing milliseconds that are of interest in the reverberation design.

TABLE 1

Initial Prime Numbers in Milliseconds for Reverberation

| | | | |
|---|---|---|---|
| 2 ms | 3 ms | 5 ms | 7 ms |
| 11 ms | 13 ms | 17 ms | 19 ms |
| 23 ms | 29 ms | 31 ms | 37 ms |
| 41 ms | 43 ms | 47 ms | 53 ms |
| 59 ms | 61 ms | 67 ms | 71 ms |
| 79 ms | 83 ms | 89 ms | 97 ms |

To make the integer multiples of these numbers relatively prime to each other, a delta is added to each number resulting in fully relatively prime comb filter delay figures in Table 2. These numbers were chosen experimentally by viewing impulse responses and looking for and eliminating constructive interferences.

TABLE 2

| Integer Multiple Relatively Prime Numbers in Milliseconds for Reverberation | | | |
|---|---|---|---|
| 2.1 ms | 3.1 ms | 5.9 ms | 6.9 ms |
| 11.7 ms | 13.1 ms | 17.9 ms | 19.4 ms |
| 23.2 ms | 29.1 ms | 31.3 ms | 37.15 ms |
| 41.9 ms | 43.7 ms | 47.1 ms | 53.9 ms |
| 59.1 ms | 61.3 ms | 67.1 ms | 71.3 ms |
| 79 ms | 83 ms | 89 ms | 97.9 ms |

According to the chosen order (N) of the comb filter section, N of the values in Table 2 are used to create the reverberation section. These values should be chosen based on the desired sound characteristics of the reverberation concealment technique.

The determined delay values (in milliseconds) are then converted to integer sample amounts for comb filter loop implementation. Equation 4 describes the integer sample delay calculation for each comb filter.

$$\text{comb\_delay}(i)=\text{round}[(\text{delay\_amount\_}ms*FS)-LPF\text{\_delay\_match}] \quad \text{(EQ. 4)}$$

where FS=the sample rate of the system and LPF_delay_match=the group delay of the low-pass filter.

In some embodiments, it is desirable to design the group delay of the LPF to be an integer delay in order to easily compensate for its delay in Equation 4.

In order to get a decaying impulse response, attenuation is inserted in the comb filter loop. Every echo that is received should be attenuated proportionally to how much time it took to receive the echo. This models the natural attenuation of a sound in free air since sound does not propagate in a straight line, but rather in a three dimensional spherical manner. The attenuation amount can be modeled by an exponentially decreasing function given in Equation 5.

$$\text{comb\_filter\_loop\_gain}(i)=LPF\text{\_attenuation}*e^{-[(reverb\_amount*comb\_filter\_gain(i)]} \quad \text{(EQ. 3.5)}$$

where reverb_amount=the parameter to control the length of the reverb tail and LPF_attenuation=the attenuation needed due to the low-pass filter.

The reverb tail length is controlled by allowing more or less of the energy to feedback into the comb filter loop. 'Reverb_amount' is always greater than 0 and due to the negative portion of the exponential equation, a larger parameter results in a shorter reverb and a smaller parameter results in a longer reverb. This parameter is adjustable, but in this illustrative embodiment reverb_amount=1.75 may be suitable for the purposes of the AMC algorithm. Depending on other chosen parameters, this may result in a reverb tail length of approximately 300 ms, as described by a measurement such as RT60 time.

Both the all-pass delay amounts and the all-pass gains may be experimentally and subjectively determined. The all-pass filter delay amounts affect the overall slope trend of the phase alteration; larger delays cause greater slope change. The all-pass gains control the shape of the phase response. Larger order filters cause this warped response to occur numerous times as the normalized frequency approaches one. This trend may be extrapolated out to nth order.

In order to determine the power level for periodic extension concealment, two first order averagers may be used to obtain a smoother power approximation without having to use a longer time constant. The 'alpha' parameter that controls the time constant of the averagers is computed using Equation 6. This power approximation uses a single time constant for both attack and decay since the reverberation should match the power exactly as it is just prior to engaging reverb.

$$\text{Alpha}=\left(1-10^{\frac{-DGdB}{20}}\right)^{\frac{1}{fs*Tc}} \quad \text{(EQ. 6)}$$

where DG dB=1, fs=the sample rate of the system, and Tc may be 0.005 (5 ms) in some embodiments.

It may be possible that the suggested two first order averagers could be collapsed into a more efficient first or second order structure with the same or similar performance.

With some embodiments, the reverberation power calculation is not a single time constant approximation for both attack and decay constants. The amplitude of the reverberation was experimentally shown to be very highly variable in amplitude with respect to time. If the power matching calculation occurs when the reverb happens to have little energy, when the reverb is playing and increases back to its stochastic maximum, the reverberation may be perceived as too loud, as well as risking the chance of clipping the digital signal. Of course the opposite is true; the power matching can occur at the reverb's peak leading to a chance that the reverberation concealment will be too soft. It is better to err on the side of the reverb being too soft rather than too loud to minimize the chance of perceptual annoyance.

In order to reduce the chance of the reverb being too loud, a two time constant approximation may be used. It is a fast attack, slow decay system. The fast attack time constant allows the system to track the peaks of the reverberation channel so that the highest signal level is recorded. Similarly, the slow release time constant allows this highest power level to continue to be held so that if the power calculation occurs during a low energy portion, the high energy is still accounted for in case the energy of the reverberation signal rises again.

A similar first order average calculation is used, but both the slow and fast time constant may be calculated in parallel. The output and feedback of the loop is taken to be the maximum of the two parallel signals. This accomplishes the fast attack, slow release goal since the maximum of the two is output.

With both the periodic extension and reverberation powers calculated, a power matching gain factor can be calculated with which to multiply by the reverberation concealment. The simple division outlined in EQ. 3 may meet this goal using the periodic extension power in the numerator and the reverberation power in the denominator.

It is possible that there could be a divide by zero or near zero if the reverberation power is very small. To remove this condition, both the periodic extension concealment power and the reverberation concealment power may be given a positive bias to eliminate the divide by zero condition.

Figure 15:
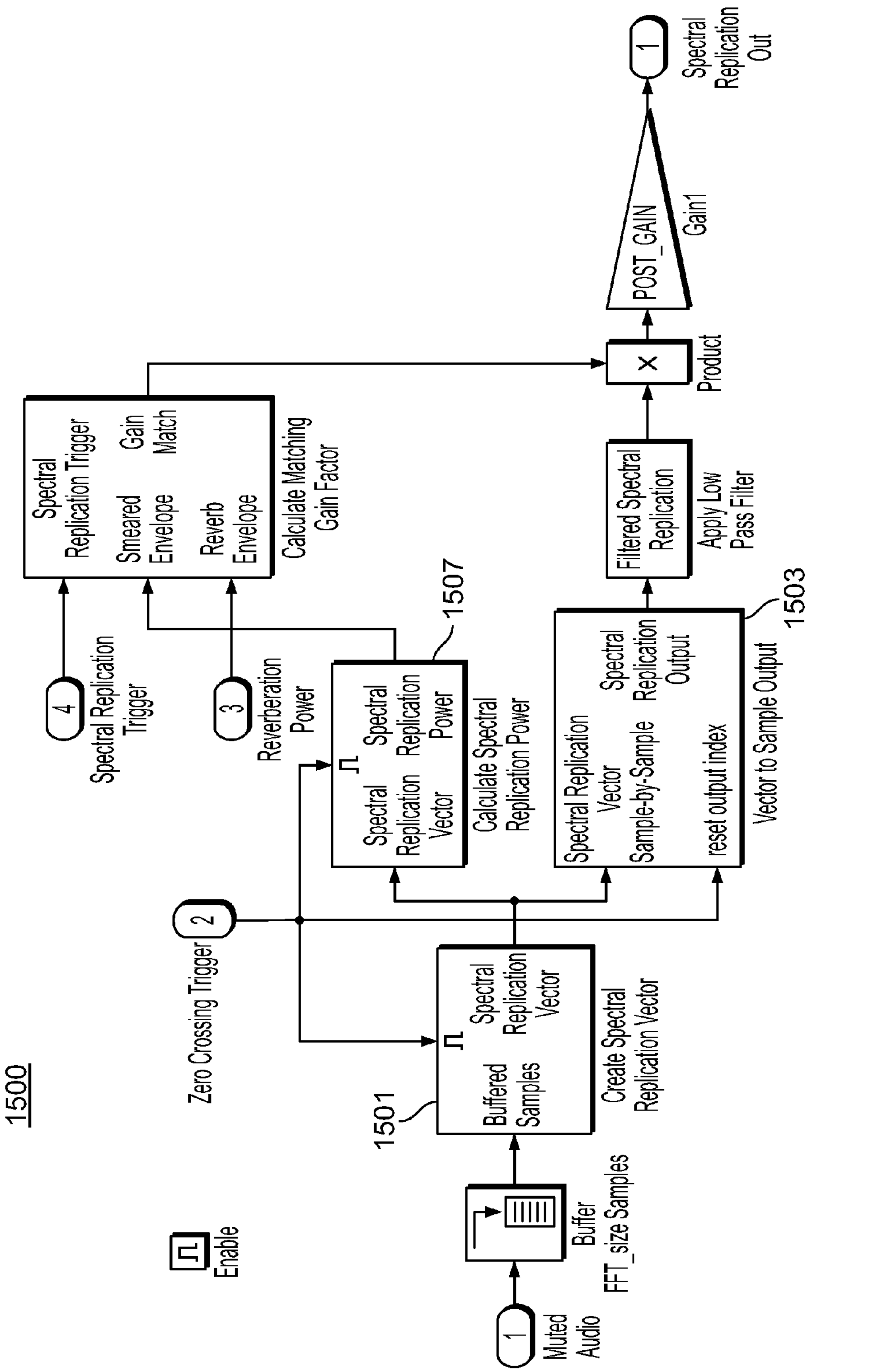
FIG. 15 shows a block diagram for a spectral replication concealment technique in accordance with aspects of the disclosure.

FIG. 15 shows block diagram 1500 for a spectral replication concealment technique in accordance with aspects of the disclosure. The spectral replication technique is a novel, low complexity process to obtain a block of audio with a relatively constant time domain envelope, e.g. one that does not contain transient temporal information, that is almost exactly shaped by the frequency spectrum of the audio just prior to applying the technique. Its purpose is similar to the reverberation concealment technique, in which the frequency content just prior to the mute is extended into the muted region. Unlike the reverberation technique, the power and frequency content of the concealed audio is not as dependent on time and is not affected by a room-related frequency response. The output of the spectral replication technique produces a time domain block of with a relatively constant time domain envelope and all of the original frequencies in the original block. In addition, the spectral replication concealment technique exploits a property of the Short-Time Fourier Transform (STFT) such that the time domain block can be repeated continuously to extend the frequency content ad infinitum.

Figure 16:
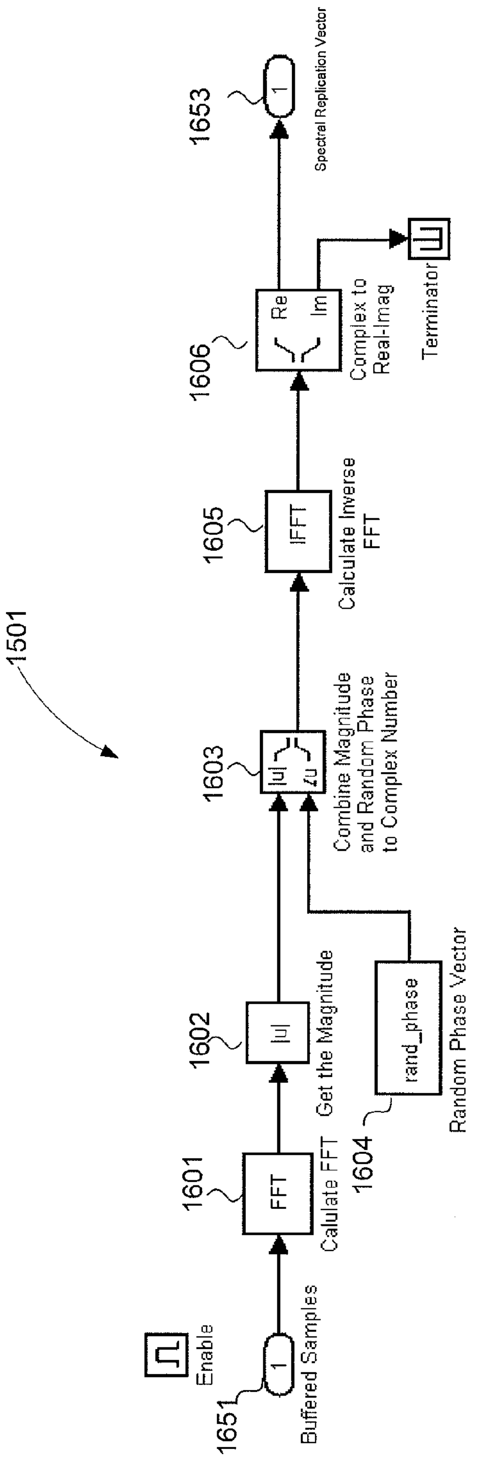
FIG. 16 shows a block diagram for spectral replication creation in accordance with aspects of the disclosure.

FIG. 16 shows a block diagram for spectral replication creation process 1501 (as shown in FIG. 15) in accordance with aspects of the disclosure. With some embodiments, buffered samples 1651 contains N samples prior to the current sample, where N is a power of two. The process begins and uses these samples when the zero crossing trigger fires to create the spectral replication. The result of the process may not be needed until at least after the periodic extension is completed, and more likely until the reverberation concealment is completed. Since buffer 1651 is ready as soon as the mute flag is received, but the spectral replication output is not needed until a later time, the process of spectral replication generation may be time-shared across the number of sample periods until spectral replication is needed.

Block 1601 then determines the FFT of buffer 1651 resulting in N complex numbers. The N points of complex FFT points are equivalent to separately calculating the N points of FFT magnitude and FFT phase. Also, the real and imaginary values of the complex FFT points correspond to the sine and cosine wave that can be added together to produce a cosine wave with any given phase position.

The very precise phase values that result from the FFT calculation indicate what position each cosine wave must be in order to combine to produce the original time domain sample values by constructive and destructive cancellation of the cosine waves. This additive and subtractive property will produce the original block of samples that contain spectral information that is changing throughout the sample position of the block.

Block 1602 calculates the magnitude of the FFT points by taking an absolute value.

Block 1603 combines the magnitude values from the FFT with a random vector of phase values ranging from $-0.9*\pi$ to $0.9*\pi$, as determined by block 1604, to produce a new set of N complex values. By combining the magnitude with random phase values, the cosine waves that originally added to the original time domain sample values now add to a new set of time domain values that have a relatively constant time domain envelope with the original total frequency content throughout the new block of samples due to the randomness of the phase of each cosine wave. Phase values between $-\pi$ and $\pi$ are used since all other possible phase values are integer multiples of $-\pi$ to $\pi$. With some embodiments, the scaling factor of 0.9 was experimentally determined to produce a smoother time domain spectral replication than full scale, i.e., $-\pi$ to $\pi$.

Block 1605 determines the inverse FFT (IFFT) of the new complex number vector to obtain time domain samples.

Block 1606 uses only the real values of the IFFT output to obtain spectral replication vector 1653. The buffer of spectral replication samples needs to be output one sample at a time by process 1503 (as shown in FIG. 15) when the system is ready for the spectral replication concealment.

Figure 17:
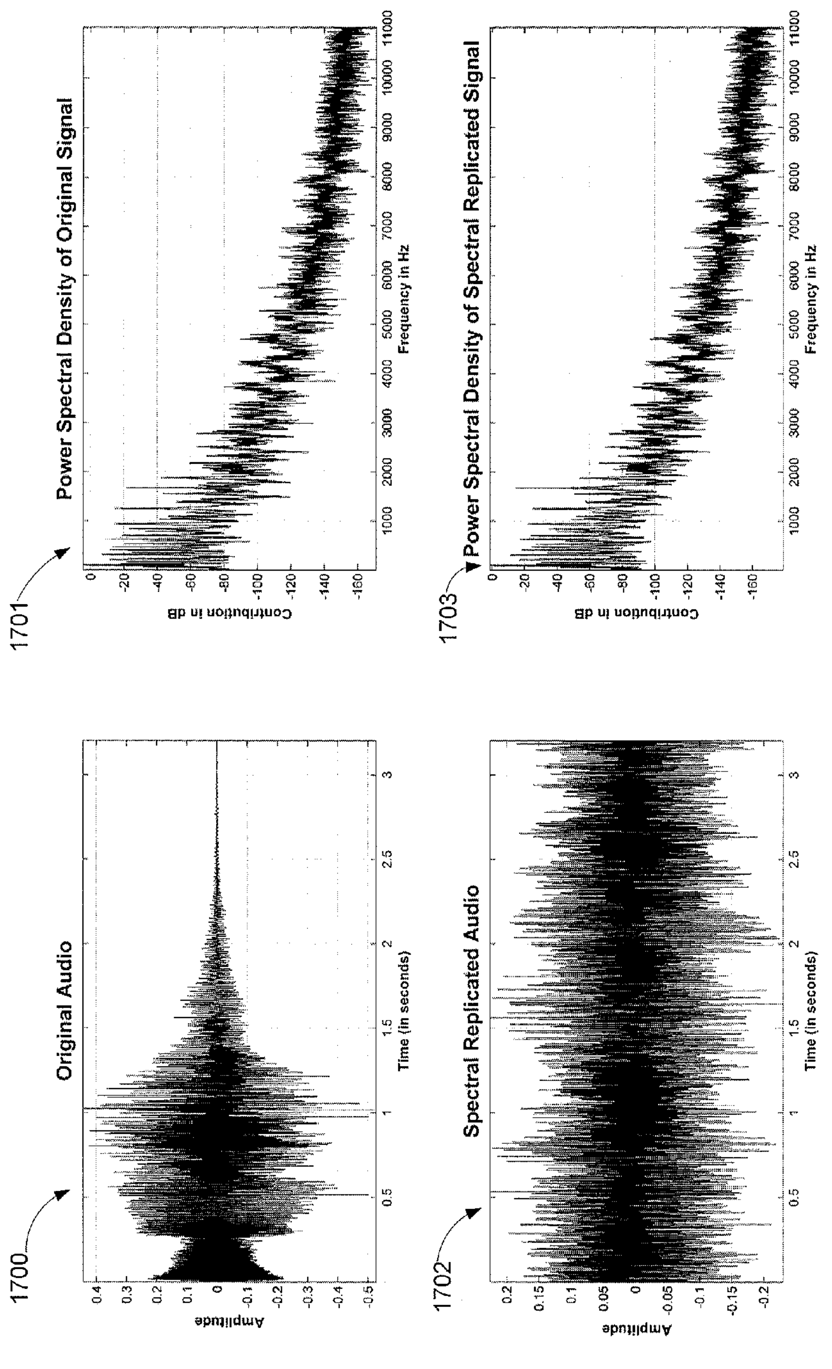
FIG. 17 shows plots that provide an example of the spectral replication creation in accordance with aspects of the disclosure.
Figure 18:
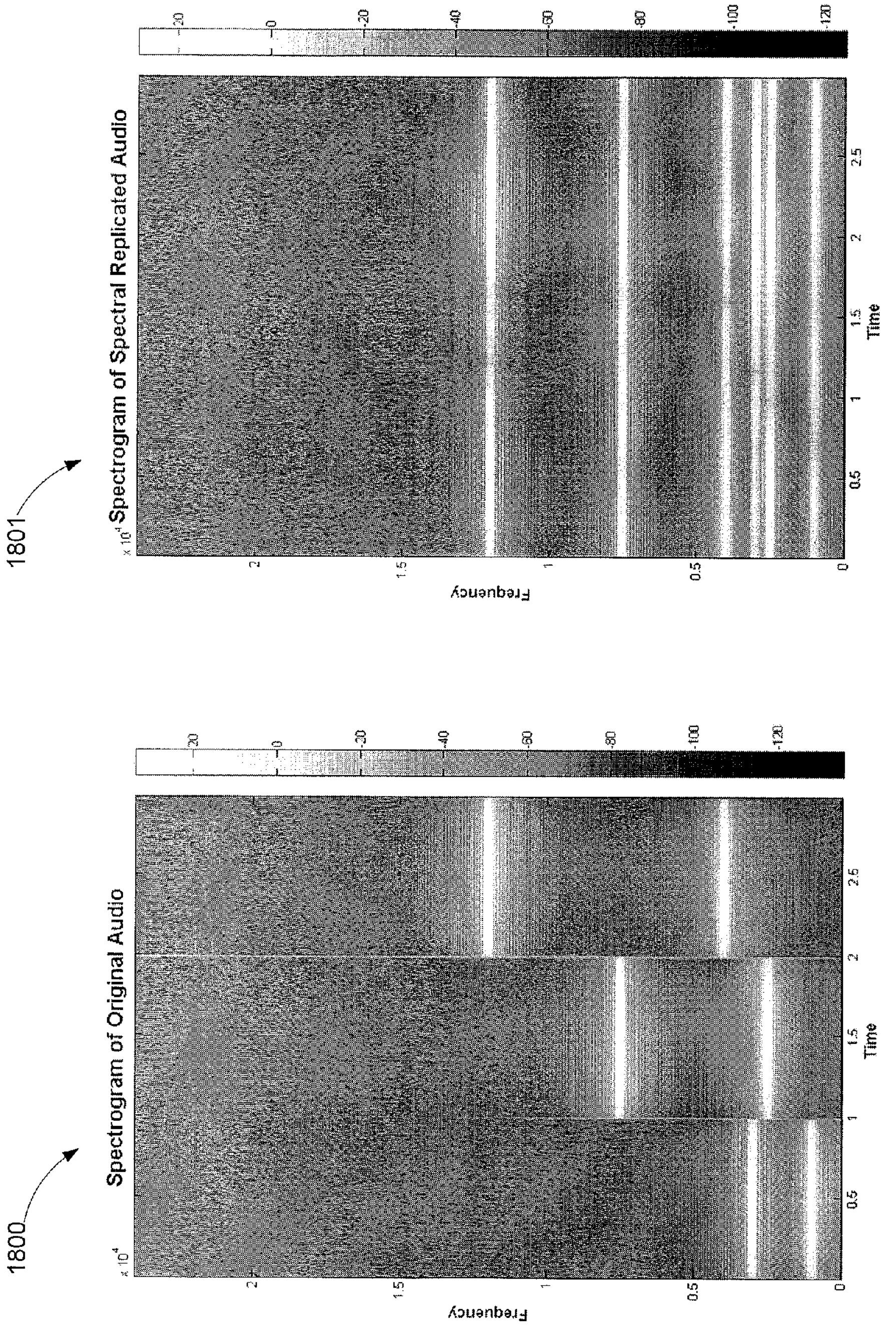
FIG. 18 shows additional plots that provide an example of the spectral replication creation in accordance with aspects of the disclosure

FIG. 17 contains plots 1700, 1701, 1702, and 1703 to provide example of the spectral replication technique. The time domain signal shown in plot 1700 is 3.25 seconds of a wave file with a sampling rate of 22.050 kHz. Plot 1701 exhibits the Power Spectral Density of this original signal. The Power Spectral Density analysis technique is employed for this example to show similarities in spectrum using an analysis tool other than the FFT. Plot 1702 shows the spectral replication of the original audio file. The time domain envelope is nearly constant in this file, particularly as compared to the original audio. Plot 1703 shows the Power Spectral Density of the spectral replication to be nearly identical to the original audio. FIG. 18 contains plots 1800 and 1801 to show the frequency content of the original audio and the spectral replication over time using the spectrogram, a visual plot of the sliding window short-time FFT (STFT). This example uses a different audio waveform than FIG. 17 for clear illustration. This original audio file 1800 is three seconds of dual sine tones. Two tones are presented simultaneously for one second. Each second a different set of tones is presented. After the spectral replication technique, plot 1801 shows the spectrogram of all 6 sine tones present throughout the three second passage of time.

The spectral replication concealment may be low-pass filtered for similar reasons to the low-pass filtering of the reverberation concealment. In addition to reducing the possibility of a user perceiving deployment of spectral replication concealment, the low pass filter also reduces any possibility of sample discontinuities in the last sample of the spectral replication overlapping into the first sample of the next repetition of the spectral replication.

Although the spectral replication technique may continue repeating ad infinitum, the repetition is typically not imperceptible. While the phase randomization technique typically works quite well, it does not create an absolutely perfectly constant frequency response over the window due in large part to FFT band leakage and the level of true randomness of phase, nor does it have an exactly constant time domain envelope. In addition, the human ear/brain system is incredibly efficient at detecting predictable, periodic sounds. As a result, the technique should be used only for a short time (perhaps less than 500 milliseconds) although this time has not been experimentally determined. Careful selection of the buffer length N as well as the phase randomization vector may reduce the perception of the periodicity.

The power calculation equation (as utilized by process 1507 as shown in FIG. 15) for spectral replication is similar to other concealment techniques, with the exception of an injection of the first sample value into the memory of the averaging calculation to approximate the initial power without the time constant affecting the energizing of the filter. This provides a temporary instant attack so that regardless of length of the sample window, the power calculation is approximated well without having to perform a power calculation over multiple copies of the window. Matching the power of the spectral replication concealment to the reverberation concealment is similar to matching the power of periodic extension concealment to reverberation concealment.

Spectral replication is characterized by a number of adjustable parameters. For example, the number of points, N, is typically determined experimentally according to audio program material and sample rate. Larger N values may produce a better estimation of the frequency content; however, the larger N also considers frequency content that may be too far in the past to conceal the mute properly. Smaller N values may not consider enough frequency content prior to the mute, and increases the probability of repetition perception. Additionally, the random phase vector may be chosen based on audio program material. If the spectral replication is to repeated, the amount of block overlap may be subjectively chosen as well.

As previously discussed, these parameters may be controlled by audio characteristic detector 612.

Figure 19:
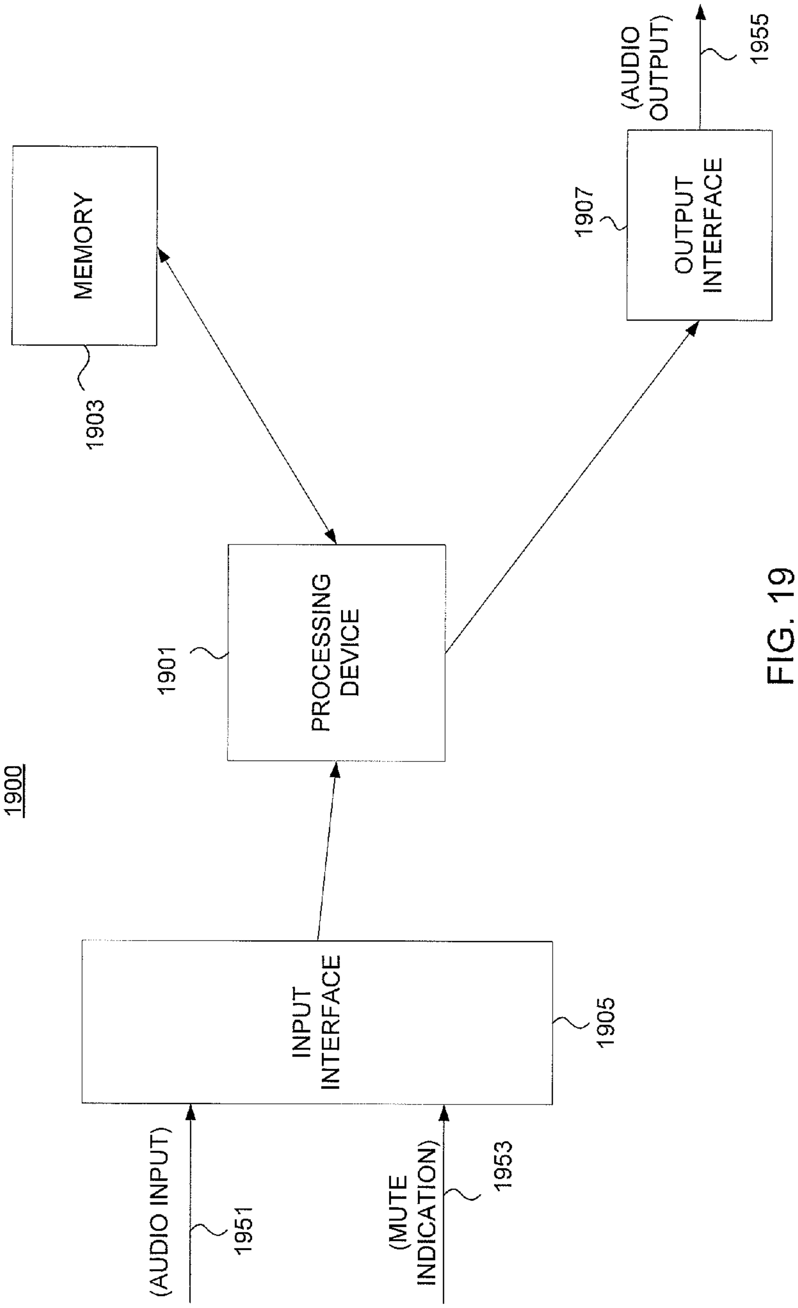
FIG. 19 shows an apparatus that performs audio mute concealment in accordance with aspects of the disclosure.

FIG. 19 shows apparatus 1900 that performs audio mute concealment in accordance with aspects of the disclosure. Processing device 1901 may execute computer executable instructions from a computer-readable medium, for example, memory 1903 in order perform a data transmission process (any or all of the transmission processes described herein). Computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processing device 1901. The executable instructions may carry out any or all of the method steps described herein.

With some embodiments, processing device 1901 may comprise one or more processors. For example, processing device 1901 may include a digital signal processor (DSP) or other microprocessors utilizing one or more cores to implement one concealment technique while another microprocessor may perform another concealment technique.

With some embodiments, apparatus 1900 may be implemented as one or more processing devices providing non-sequential and/or parallel processing such as programmable logic devices (PLDs) or application specific integrated circuits (ASICs) or other integrated circuits having instructions or logical processing for performing operations as described in connection with one or more of any of the embodiments described herein. Said instructions may be software and/or firmware instructions stored in a machine-readable medium and/or may be hard-coded as a series of logic gates and/or state machine circuits in one or more integrated circuits and/or in one or more integrated circuits in combination with other circuit elements.

While the invention has been described with respect to specific examples including present modes of carrying out the invention, those skilled in the art will appreciate that there may be numerous variations and permutations of the above described systems and techniques that fall within the spirit and scope of the exemplary embodiments of the invention as set forth in the appended claims.

What is claimed is:

1. A method comprising:

(a) when a mute interval of an audio signal is detected, activating one of a plurality of concealment generators to form a concealment signal and activating a timer, each concealment generator utilizing a different concealment technique;

(b) while the mute interval continues and when the timer equals a predetermined activation time, activating a different concealment generator of the plurality of concealment generators and deactivating a previously activated concealment generator to extend the concealment signal;

(c) repeating (b) while the mute interval continues;

(d) adding the concealment signal when there is a gap in the audio signal during the mute interval, wherein:

the concealment signal replaces the audio signal during at least a portion of the mute interval; and the concealment signal is independent of knowledge about the audio signal after the mute interval; and (e) when the mute interval ends, deactivating a currently activated concealment generator.

2. The method of claim 1, wherein the activating the different concealment generator comprises:

phasing in the different concealment generator during a predetermined transition interval; and phasing out the previously activated concealment generator during the predetermined transition interval.

3. The method of claim 1, wherein the plurality of concealment generators support a periodic extension technique and a reverberation concealment technique.

4. The method of claim 1 further comprising:

deactivating the different concealment generator and activating another concealment generator at a subsequent predetermined activation time.

5. The method of claim 4, wherein the other concealment generator utilizes a spectral replication concealment technique.

6. The method of claim 3, further comprising:

the periodic extension technique utilizing a time domain reversal of buffered samples of the audio signal after a zero crossing with a flip in waveform polarity to prevent a waveform discontinuity.

7. The method of claim 6, further comprising:

extending audio content prior to the mute interval using a self-prediction technique on which to perform zero crossing detection.

8. The method of claim 5, wherein the spectral replication technique detects the mute interval of the audio signal, obtains buffered samples of the audio signal before the mute interval occurs, performs a spectral analysis of the buffered samples to obtain spectral samples, determines a magnitude of each spectral sample, combines the magnitude and a random phase value for each said spectral sample to obtain modified spectral samples, performs an inverse spectral analysis of the modified spectral samples to obtain time domain samples, removes an imaginary component of each time domain sample to obtain modified time domain samples, and adds the modified time domain samples to the audio signal during the mute interval.

9. The method of claim 1, further comprising:

matching a concealment signal power level with an audio power level of the audio signal before the mute interval when one of the plurality of concealment generators is activated.

10. The method of claim 1, further comprising:

matching a previous concealment power level of the previously activated concealment generator with a current concealment power level of the currently activated concealment generator.

11. The method of claim 2, wherein the phasing in utilizes a linearly increasing function and the phasing out utilizes a linearly decreasing function.

12. The method of claim 2, wherein the phasing in utilizes a logarithmically increasing function and the phasing out utilizes a logarithmically decreasing function.

13. The method of claim 1, wherein the deactivating the currently activated concealment generator utilizes a linearly decreasing function, and the method further comprises:

when the mute interval ends, phasing in the audio signal with a linearly increasing function.

14. The method of claim 1, wherein the deactivating the currently activated concealment generator utilizes a logarithmically decreasing function, and the method further comprises:

when the mute interval ends, phasing in the audio signal with a logarithmically increasing function.

15. The method of claim 1, wherein different concealment generators are chosen for execution based on an audio feature analysis of the audio signal prior to the mute interval.

16. The method of claim 1, wherein parameters for different concealment generators are chosen or altered based on an audio feature analysis of the audio signal prior to the mute interval.

17. The method of claim 2, wherein characteristics of the phasing in and the phasing out are determined by an audio feature analysis of the audio signal prior to the mute interval.

18. The method of claim 1, wherein (a)-(e) are performed without information about audio content that occurs after the mute interval.

19. An apparatus comprising:

at least one processing device;

a memory having stored therein machine executable instructions or firmware for logical processing, that when executed, cause the apparatus to:

(a) when a mute interval of an audio signal occurs, activate one of a plurality of concealment generators to form a concealment signal, activate a timer, and match the power level of the audio signal before the mute interval when said one of the plurality of concealment generators is activated, wherein each concealment generator utilizes a different concealment technique;

(b) while the mute interval continues and when the timer equals a predetermined activation time, activate a different concealment generator of the plurality of concealment generators, deactivate a previously activated concealment generator to extend the concealment signal, and match power levels associated with the different concealment generator and the previously activated concealment generator;

(c) repeat (b) while the mute interval continues;

(d) add the concealment signal when there is a gap in the audio signal during the mute interval, wherein:

the concealment signal replaces the audio signal during at least a portion of the mute interval; and the concealment signal is independent of knowledge about the audio signal after the mute interval; and (e) when the mute interval ends, deactivate a currently activated concealment generator.

20. The apparatus of claim 19, wherein the apparatus does not utilize information about audio content that occurs after the mute interval.

21. The apparatus of claim 19, wherein the memory further causes the apparatus to:

phase in the different concealment generators during a predetermined transition interval; and phase out the previously activated concealment generators during the predetermined transition interval.

22. The apparatus of claim 19, wherein the memory further causes the apparatus to:

phase in the different concealment generator based on information obtained from an audio feature analysis prior to the mute interval; and phase out the previously activated concealment generator based on the information obtained from the audio feature analysis prior to the mute interval.

23. A non-transitory computer-readable storage medium storing computer-executable instructions that, when executed, cause a processor to perform:

(a) when a mute interval of an audio signal is detected, activating one of a plurality of concealment generators to form a concealment signal and activating a timer, each concealment generator utilizing a different concealment technique;

(b) while the mute interval continues and when the timer equals a predetermined activation time, activating a different concealment generator of the plurality of concealment generators and deactivating a previously activated concealment generator to extend the concealment signal;

(c) repeating (b) while the mute interval continues;

(d) adding the concealment signal when there is a gap in the audio signal during the mute interval, wherein:

the concealment signal replaces the audio signal during at least a portion of the mute interval; and the concealment signal is independent of knowledge about the audio signal after the mute interval; and (e) when the mute interval ends, deactivating a currently activated concealment generator.

24. The computer-readable storage medium of claim 23, wherein (a)-(e) are performed without information about audio content that occurs after the mute interval.

25. The computer-readable storage medium of claim 23, said method further comprising:

phasing in the different concealment generator during a predetermined transition interval; and phasing out the previously activated concealment generator during the predetermined transition interval.

26. The computer-readable storage medium of claim 24, said method further comprising:

matching a concealment power level with an audio power level of the audio signal before the mute interval when said one of the plurality of concealment generators is activated.

27. The computer-readable storage medium of claim 23, said method further comprising:

matching a previous concealment power level of the previously activated concealment generator with a current concealment power level of the currently activated concealment generator.

28. A non-transitory computer-readable storage medium storing instructions or logical processing that, when excited with input data stimulus, cause an apparatus to perform:

(a) when a mute interval of an audio signal is detected, activating one of a plurality of concealment generators to form a concealment signal and activating a timer, each concealment generator utilizing a different concealment technique;

(b) while the mute interval continues and when the timer equals a predetermined activation time, activating a different concealment generator of the plurality of concealment generators and deactivating a previously activated concealment generator to extend the concealment signal;

(c) repeating (b) while the mute interval continues;

(d) adding the concealment signal when there is a gap in the audio signal during the mute interval, wherein:

the concealment signal replaces the audio signal during at least a portion of the mute interval; and the concealment signal is independent of knowledge about the audio signal after the mute interval; and (e) when the mute interval ends, deactivating a currently activated concealment generator.

29. A wireless microphone system comprising:

a receiver providing an indication of a mute interval of an audio signal to a concealment processing component; and the concealment processing component including:

a plurality of concealment generators;

a timer;

at least one processor;

at least one memory having stored therein machine executable instructions, that when executed, cause the concealment processing component to:

(a) activate one of the plurality of concealment generators to form a concealment signal and activating the timer, each concealment generator utilizing a different concealment technique;

(b) while the mute interval continues and when the timer equals a predetermined activation time, activating a different concealment generator of the plurality of concealment generators and deactivating a previously activated concealment generator to extend the concealment signal;

(c) repeating (b) while the mute interval continues;

(d) adding the concealment signal when there is a gap in the audio signal during the mute interval, wherein:

the concealment signal replaces the audio signal during at least a portion of the mute interval; and the concealment signal is independent of knowledge about the audio signal after the mute interval; and (e) when the mute interval ends, deactivating a currently activated concealment generator.

30. The wireless microphone system of claim 29 wherein said one concealment generator utilizes a periodic extension concealment technique and the different concealment generator utilizes a reverberation concealment technique.

31. The wireless microphone system of claim 29 wherein said one concealment generator utilizes a periodic extension concealment technique and the different concealment generator utilizes a spectral replication technique.

32. The wireless microphone system of claim 29 in which the concealment processing component performs (a)-(e) without information about audio content that occurs after the mute interval.

33. The method of claim 1, further comprising:

matching the concealment signal with at least one characteristic of the audio signal that characterizes the audio signal before the mute interval.

34. The method of claim 1 wherein the plurality of concealment generators comprises a self-prediction technique and a periodic extension technique.

35. The method of claim 6, further comprising: using a buffered window taper to force the zero crossing after a time interval on which to perform a periodic extension.

36. The method of claim 1 wherein the plurality of concealment generators comprises a periodic extension technique and a spectral replication technique.

* * * * *